(12) United States Patent
Bollstrom et al.

(10) Patent No.: US 12,345,634 B2
(45) Date of Patent: Jul. 1, 2025

(54) METHOD AND APPARATUS FOR DETECTING AN AMORPHOUS AND/OR CRYSTALLINE STRUCTURE OF PHOSPHATE AND/OR SULPHATE SALTS ON THE SURFACE OF A SUBSTRATE OR WITHIN A SUBSTRATE

(71) Applicant: OMYA INTERNATIONAL AG, Oftringen (CH)

(72) Inventors: Roger Bollstrom, Zofingen (CH); Gilbert Botty, Maastricht (NL)

(73) Assignee: OMYA INTERNATIONAL AG, Oftringen (CH)

( * ) Notice: Subject to any disclaimer, the term of this patent is extended or adjusted under 35 U.S.C. 154(b) by 231 days.

(21) Appl. No.: 18/257,379

(22) PCT Filed: Dec. 22, 2021

(86) PCT No.: PCT/EP2021/087186
§ 371 (c)(1),
(2) Date: Jun. 14, 2023

(87) PCT Pub. No.: WO2022/136490
PCT Pub. Date: Jun. 30, 2022

(65) Prior Publication Data
US 2024/0019361 A1 Jan. 18, 2024

(30) Foreign Application Priority Data
Dec. 23, 2020 (EP) ..................................... 20216916

(51) Int. Cl.
*G01N 21/3563* (2014.01)
*G01N 21/88* (2006.01)
(Continued)

(52) U.S. Cl.
CPC ...... *G01N 21/3563* (2013.01); *G01N 21/8803* (2013.01); *G02B 7/36* (2013.01); *G01N 2021/4735* (2013.01)

(58) Field of Classification Search
CPC ........... G01N 21/3563; G01N 21/8803; G01N 2021/4735; G01N 2201/0221; G01N 21/474; G02B 7/36
See application file for complete search history.

(56) References Cited

U.S. PATENT DOCUMENTS 9,204,109 B1 12/2015 deLaneuville et al.
2008/0042063 A1 2/2008 Chen
(Continued)

FOREIGN PATENT DOCUMENTS

CN 202230219 U 5/2012
CN 103713347 A 4/2014
(Continued)

OTHER PUBLICATIONS

International Search Report from PCT/EP2021/087186, mailed Apr. 7, 2022, 4 pages.
(Continued)

*Primary Examiner* — Kiho Kim
(74) *Attorney, Agent, or Firm* — ALGM LLP; Harry J. Guttman

(57) ABSTRACT

A method for detecting amorphous and/or crystalline structures of phosphate and/or sulphate salts on or within a substrate involves providing an LWIR imaging system with an infrared light emitting source (A) configured to emit infrared light over the range of 8 to 14 micrometers, an LWIR detecting device (B) configured to detect the intensity of electromagnetic radiation scattered, emitted, and/or reflected by the substrate, and control circuitry for the LWIR detecting device. The method further comprises providing
(Continued)

Transmission based LWIR imaging system the substrate, irradiating it with the infrared light emitting source, acquiring a stream of temporally consecutive images using the LWIR detecting device, and selecting, based on processing the acquired stream of images with the control circuitry, at least one focused image where the amorphous and/or crystalline structures of phosphate and/or sulphate salts are substantially in focus of the LWIR detecting device.

24 Claims, 5 Drawing Sheets

(51) Int. Cl.
*G02B 7/36* (2021.01)
*G01N 21/47* (2006.01)

(56) References Cited

U.S. PATENT DOCUMENTS

| | | | |
|---|---|---|---|
| 2010/0157049 A1* | 6/2010 | Dvir | G08B 13/19641 348/169 |
| 2012/0031576 A1 | 2/2012 | Gane et al. | |
| 2014/0240512 A1* | 8/2014 | Hogasten | H04N 25/76 348/164 |
| 2014/0240692 A1 | 8/2014 | Tien et al. | |
| 2018/0157012 A1 | 6/2018 | Jin | |

FOREIGN PATENT DOCUMENTS

| | | |
|---|---|---|
| CN | 107729907 A | 2/2018 |
| CN | 108693625 A | 10/2018 |
| EP | 1712523 A1 | 10/2006 |
| EP | 1712597 A1 | 10/2006 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2524898 A1 | 11/2012 |
| EP | 2743724 A1 | 6/2014 |
| EP | 2764320 A0 | 8/2014 |
| EP | 3067214 A1 | 9/2016 |
| EP | 3173522 A1 | 5/2017 |
| EP | 3191870 | 7/2017 |
| TW | 200511592 A | 3/2005 |
| WO | 00/39222 | 7/2000 |
| WO | 2009/074492 A1 | 6/2009 |
| WO | 2013/142473 A1 | 9/2013 |
| WO | 2015/097284 A1 | 7/2015 |
| WO | 2017/204756 A1 | 11/2017 |
| WO | 2018/215333 A1 | 11/2018 |

OTHER PUBLICATIONS

Written Opinion from PCT/EP2021/087186, mailed Apr. 7, 2022, 10 pages.
Beland et al. (2018) "Portable LWIR hyperspectral imager based on a MEMS Fabry-Perot interferometer and a broadband microbolometric detector array" Proc. of SPIE, vol. 10545, Article 105450S (11 pages).
CN103713347A (Apr. 9, 2014) English-language abstract from Espacenet, 1 page.
CN107729907A (Feb. 23, 2018) English-language abstract from Espacenet, 1 page.
CN108693625A-(Oct. 23, 2018) English-language abstract from Espacenet, 1 page.
CN202230219U (May 23, 2012) English-language abstract from Espacenet, 1 page.
EP2743724A1 (Jun. 18, 2014) English-language abstract from Espacenet, 1 page.
TW200511592A (Mar. 16, 2005) English-language abstract from Espacenet, 1 page.

* cited by examiner

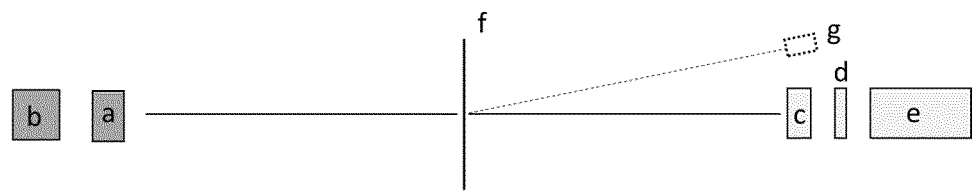
Figure 1. Transmission based LWIR imaging system
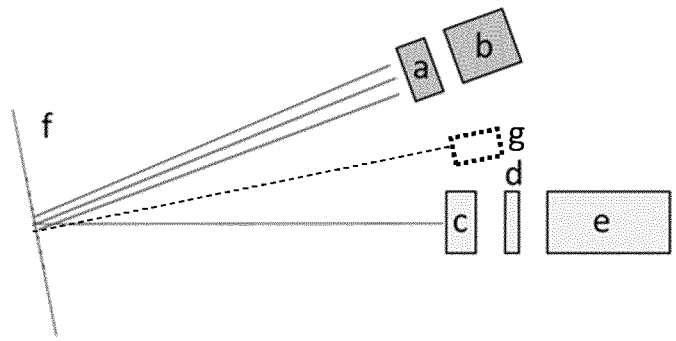
Figure 2. Reflectance based LWIR imaging system
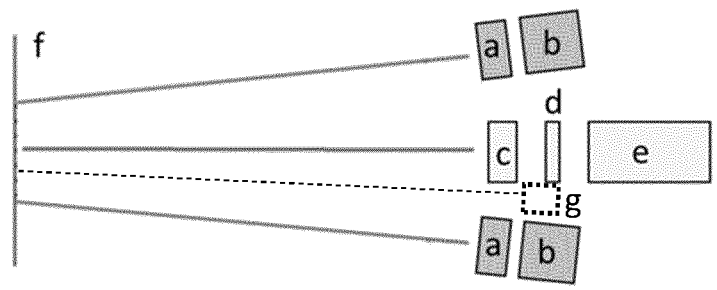
Figure 3. Reflectance based LWIR imaging system

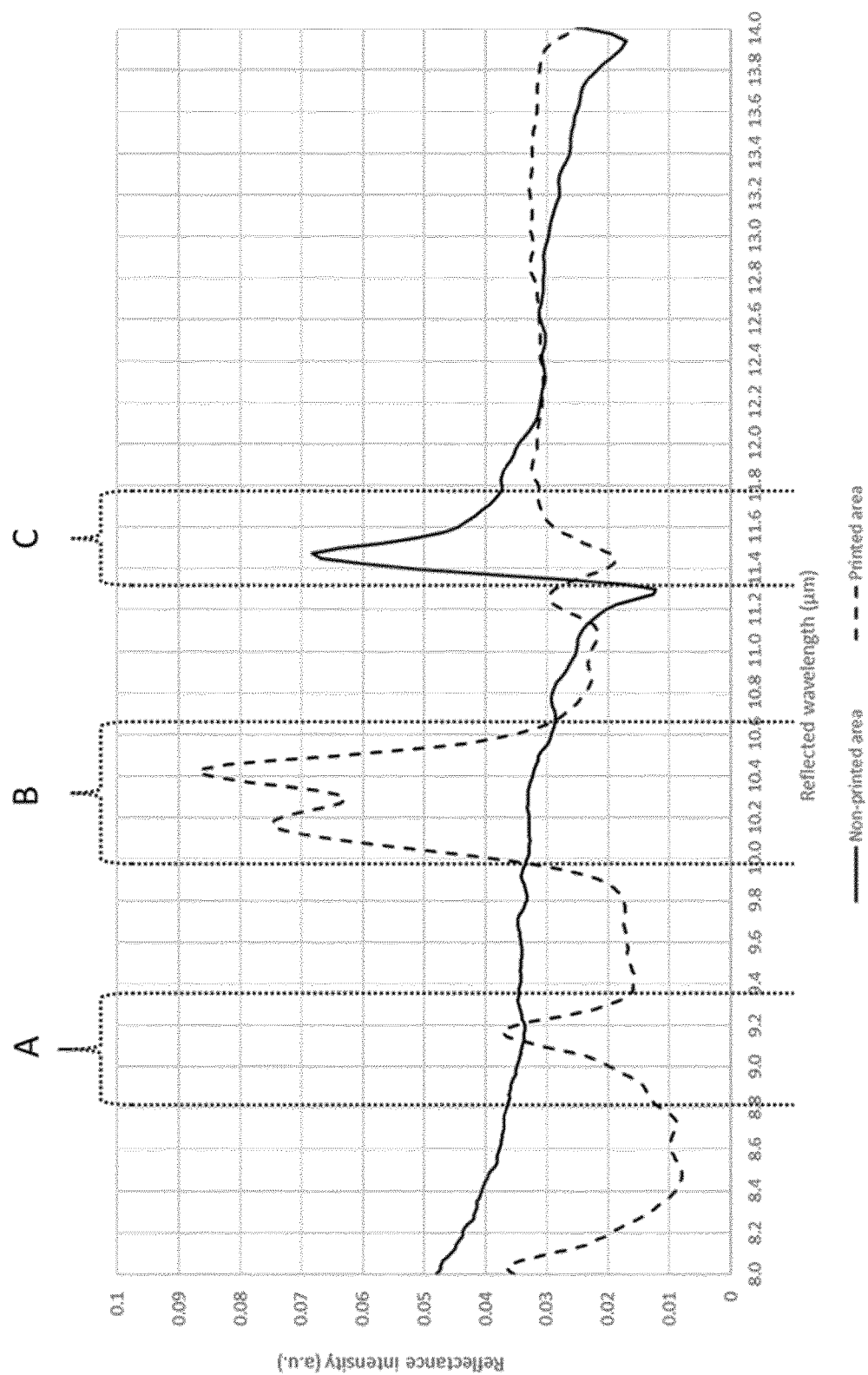
Figure 4. Infrared spectra between 8 and 14 μm

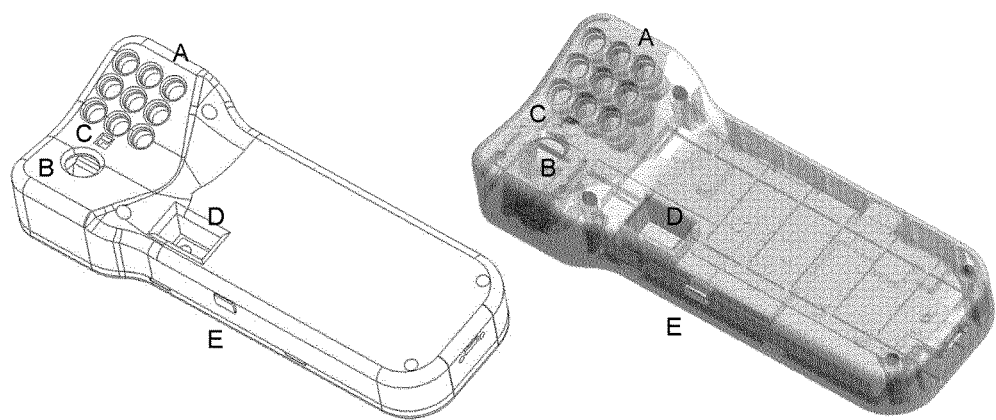
Figure 5: Lower shell of the LWIR imaging system in the form of a handheld housing
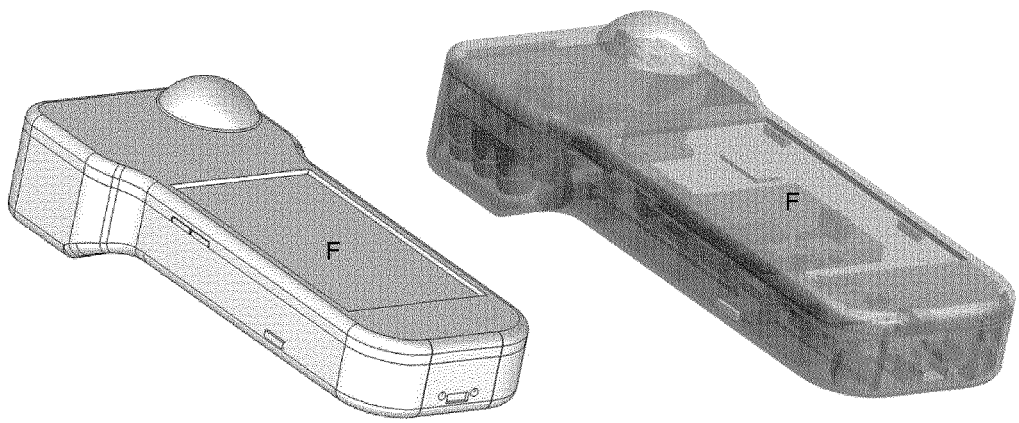
Figure 6: Upper shell of the LWIR imaging system in the form of a handheld housing

Figure 7: Upper and lower shell of the LWIR imaging system in the form of a handheld housing
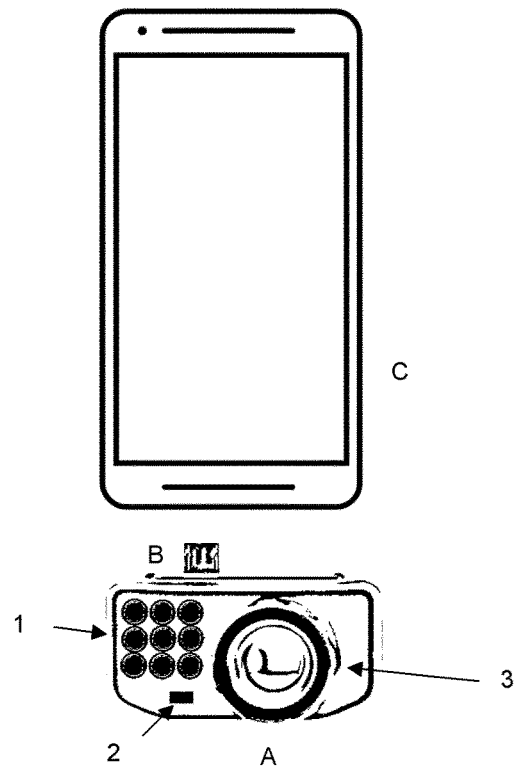
Figure 8: LWIR imaging system in the form of a snap-on device with connection to a mobile phone

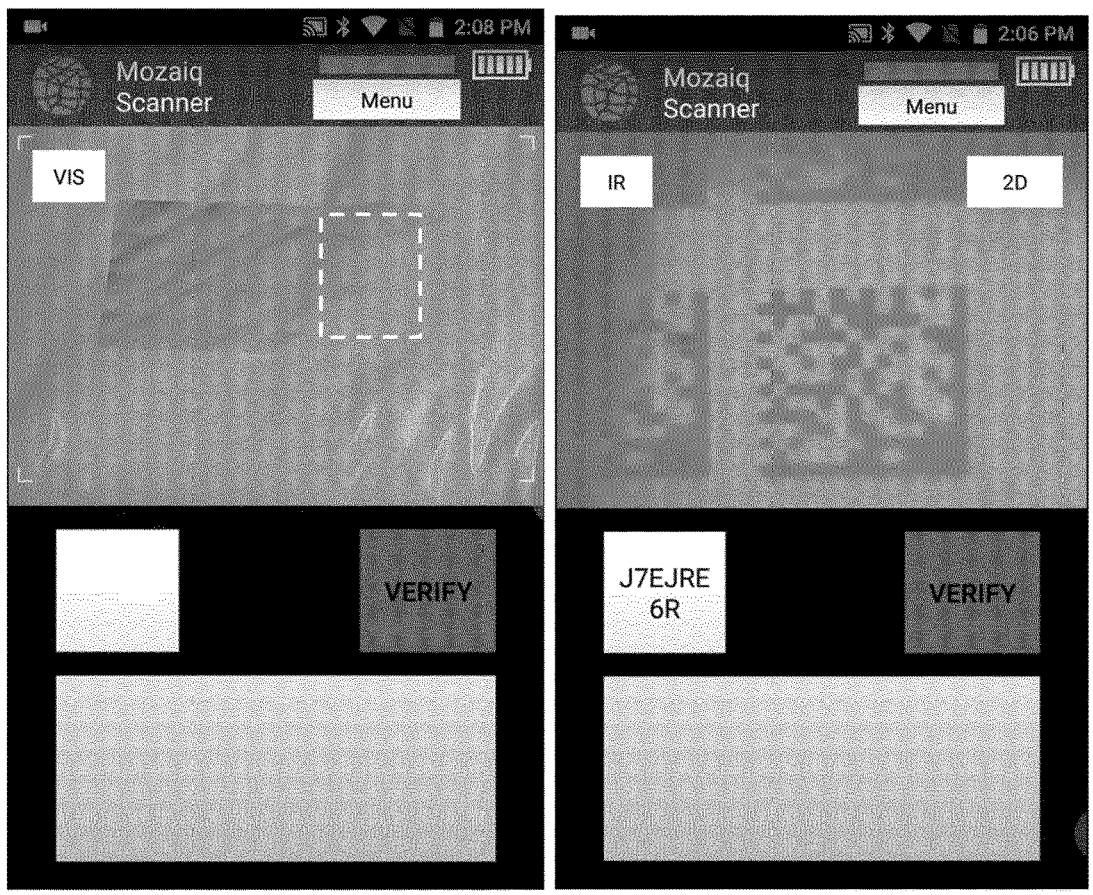
Figure 9: Pictures taken with a standard visible camera (left) and an LWIR imaging system according to the present disclosure, wherein the infrared light emitting source is a Peltier element (right), of a substrate comprising an amorphous and/or crystalline structure of phosphate and/or sulphate salts on the surface

METHOD AND APPARATUS FOR DETECTING AN AMORPHOUS AND/OR CRYSTALLINE STRUCTURE OF PHOSPHATE AND/OR SULPHATE SALTS ON THE SURFACE OF A SUBSTRATE OR WITHIN A SUBSTRATE

The present invention generally relates to a method for detecting an amorphous and/or crystalline structure of phosphate and/or sulphate salts on the surface of a substrate or within a substrate, in particular using a Long-Wave-Infrared (hereinafter "LWIR") imaging system and/or an LWIR imaging arrangement. The present invention further relates to an LWIR imaging system and/or an LWIR imaging arrangement for detecting an amorphous and/or crystalline structure of phosphate and/or sulphate salts on the surface of a substrate or within a substrate. Further, the present invention relates to a use of an LWIR imaging system and/or an LWIR imaging arrangement for detecting an amorphous and/or crystalline structure of phosphate and/or sulphate salts on the surface of a substrate or within a substrate.

Printing of substrates, for example papers, with printing inks is a wide known technique. Newspapers, leaflets, labels, pictures etc. are nowadays printed with various printing techniques and printing colors. The print on the substrate can be detected by human eyes, but only if there is a further light source like sun light. Furthermore, the print can only be detected if the colour of the print and the substrate are different. However, in some cases it is desirable to detect the printing or coating on a substrate even in the dark. Furthermore, it is desirable to print or coat a substrate with a pattern that is not visible or hardly visible to human eyes, but can be detected with other detecting methods, for example, by irradiation with Infra Red (IR) light.

IR light has a longer wavelength than visible light. Even if IR light shares many of the properties of visible light, its different wavelength has several unique characteristics. For example, materials that are opaque to visible light may be transparent to IR, and vice-versa. Furthermore, IR light is much less subject to scattering and absorption by smoke or dust than visible light, and IR light cannot be seen by the human eye. Contrary to visible light that is emitted by objects only at very high temperatures, IR energy is also emitted by all objects at temperatures higher than 0 Kelvin (−273.15° C.). Therefore, IR energy is omnipresent all the time, even in the dark and at very low temperatures. Different objects emit varying amounts of IR energy, depending on the temperature of the object and their emissivity. IR detecting devices can sense or detect differing intensities of IR energy coming from the various areas of a scene. Usually, an IR detecting device converts the detected electromagnetic radiation to corresponding intensities of visible light by electronics, for example a computer device for display purposes. This permits true see-in-the-dark capability as well as the ability to observe thermal properties under all light conditions. Furthermore, this permits the ability to detect structural differences on objects or within objects, for example, due to different compounds, that are not detectable by the human eye.

IR detecting devices and methods are known to the skilled person, for example from US2018157012 A1 that refers to an infrared optical system using the wavelength range of 3 to 5 μm, in the order from an object side, a first lens having a negative power and formed with a convex meniscus toward an object, a second lens that is convex on both sides, and a cold aperture.

TW200511592 A refers to an IR camera system which includes an array of thermally-tunable optical filter pixels, an NIR source and an NIR detector array.

CN107729907 A refers to an infrared thermal imaging system-based fault recognition method, the method comprising the steps of shooting electric equipment by adoption of an infrared thermal imaging system so as to obtain an infrared image of the electric equipment and fusing the infrared image of the electric equipment after the expansion processing with a visible image of original electric equipment so as to differentiate heating targets in the electric equipment from surrounding background.

U.S. Pat. No. 9,204,109 B1 refers to IR detection of small cracks during fatigue testing and especially, a process for producing a small crack in a turbine rotor blade for use in training inspectors to be qualified for inspecting blades with small crack, where each blade is vibrated in order to initiate a small crack under observation using an IR camera that can detect for a small crack, and when a small crack at a desired size is produced on the blade, the vibration is stopped and the blade removed and then used in a training process to train and qualify an inspector for an inspection process.

US20080042063 A1 refers to an IR imaging system including a lens module and an imaging module coupled to the lens module, wherein the lens module includes a barrel defining a through hole, at least one lens received in the through hole and an IR bandpass filter received in the barrel and configured for filtering out visible light.

However, not only the print or coating on the substrate but also the substrate itself is detectable by an IR detecting device. Often the scattered and/or emitted and/or reflected electromagnetic radiation by the substrate itself and the scattered and/or emitted and/or reflected electromagnetic radiation by the print or coating interfere or are superposed and, therefore, detection of the print or coating is impossible. Furthermore, the devices for detecting prints or coatings on a substrate or within a substrate are often large and unhandy and need special settings and/or equipment. Additionally, focusing with such devices is often not possible or complicated and complex and, therefore, the detected prints or coatings on the substrate or within the substrate are blurred and unclear and the information contained in these prints or coatings cannot be read out.

Therefore, there may be a need for providing an improved method, system and/or apparatus for detecting prints or coatings on a substrate or within a substrate that are not or only hardly detectable by the human eye, but can be detected by an IR detecting device. Furthermore, there is a need for a method, system and/or apparatus that detects prints or coatings on a substrate or within a substrate that do not interfere with the substrate or parts of the substrate. Additionally, the method should keep the substrate as well as the print or coating on the substrate intact and not destroy them. The method should be efficiently and reliably performable and should be safe for the operator. Furthermore, there may be a need for providing an improved LWIR imaging system and/or LWIR imaging arrangement that at least mitigate or even eliminate some or all of the drawbacks described above in relation to the known imaging systems. More precisely, there is a need for providing an improved LWIR imaging system and/or LWIR imaging arrangement for detecting prints or coatings on a substrate or within a substrate that are not or hardly detectable by the human eye, but can be detected by an IR detecting device. Furthermore, there may be a need for providing a LWIR imaging system and/or LWIR imaging arrangement for detecting prints or coatings on a substrate or within a substrate that do not interfere with the substrate or parts of the substrate. Furthermore, the substrate as well as the print or coating on the substrate should not be destroyed by the LWIR imaging system and/or LWIR imaging arrangement. It is therefore that the present invention provides for a non-destructive imaging and/or identification method. Additionally, it may be desirable that the LWIR imaging system and/or LWIR imaging arrangement is compact, light-weight and/or transportable and preferably can be operated as a handheld device. The LWIR imaging system and/or the LWIR imaging arrangement can be, for example, an all-in-one device, a multi component system, a snap-on device or the like, as will be described in more detail hereinbelow. Furthermore, the operation of the LWIR imaging system and/or the LWIR imaging arrangement may be efficient, fast, reliable, accurate and/or safe for the operator. In particular, it may be advantageous to provide for an LWIR imaging system and/or LWIR imaging arrangement with an efficiently and/or reliably operated for capturing, acquisition and/or focusing mechanism in order to image and/or visualize the prints, codes and/or coatings on the substrate or within the substrate clearly, sharp and focused, for example for anti-counterfeiting purposes, for tracking purposes and/or for verifying prints, codes and/or coatings, as described in more detail hereinbelow.

The invention is defined in the independent claims, wherein further embodiments are incorporated in the dependent claims and the following description.

It should be noted that some aspects of the present disclosure relate to one or more methods for detecting an amorphous and/or crystalline structure of phosphate and/or sulphate salts on the surface of a substrate or within a substrate, while further aspects of the present disclosure relate to an LWIR imaging system, an LWIR imaging arrangement, and/or a use one or both. Any feature, function, element, and/or step described hereinabove with reference to one aspect of the present disclosure equally applies to any other aspect of the present disclosure. In particular, any feature, function and/or step described hereinabove and hereinbelow with reference to one or more methods for detecting an amorphous and/or crystalline structure of phosphate and/or sulphate salts on the surface of a substrate or within a substrate, equally applies to the LWIR imaging system and/or the LWIR imaging arrangement (and/or the use thereof), described hereinabove and hereinbelow, and vice versa.

According to one aspect of the present disclosure, there is provided a method for detecting an amorphous and/or crystalline structure of phosphate and/or sulphate salts on the surface of a substrate or within a substrate. Alternatively or additionally, the method may refer to a method of operating an LWIR imaging system and/or LWIR imaging arrangement, as described hereinabove and hereinbelow. In particular, the method may refer to a non-destructive method, in which the substrate and/or the amorphous and/or crystalline structure of phosphate and/or sulphate salts on the surface of the substrate or within the substrate, including any pattern, printing, code and/or indicia optionally comprised by the amorphous and/or crystalline structure of phosphate and/or sulphate salts, is not destroyed. The method comprises the following steps:
i) providing a LWIR imaging system and/or an LWIR imaging arrangement, the LWIR imaging system and/or LWIR imaging arrangement comprising:
a) an infrared light emitting source configured to emit infrared light over the whole range of 8 to 14 μm and/or over a range of wavelengths of 8 to 14 μm,
b) a LWIR detecting device configured to detect an intensity of electromagnetic radiation scattered, emitted and/or reflected by the substrate and the amorphous and/or crystalline structure of phosphate and/or sulphate salts; and
c) a control circuitry for controlling the LWIR detecting device;
ii) providing a substrate comprising an amorphous and/or crystalline structure of phosphate and/or sulphate salts on the surface of the substrate or within the substrate;
ii) irradiating the provided substrate with the infrared light emitting source;
iii) acquiring, using the LWIR detecting device, a stream of a plurality of temporally consecutive images of the substrate and the amorphous and/or crystalline structure of phosphate and/or sulphate salts irradiated with the infrared light emitting source; and
iv) selecting, based on processing the acquired stream of images with the control circuitry, at least one focused image, in which the amorphous and/or crystalline structure of phosphate and/or sulphate salts is substantially in focus of the LWIR detecting device.

According to another aspect of the present disclosure, there is provided an LWIR imaging system and/or an LWIR imaging arrangement for detecting an amorphous and/or crystalline structure of phosphate and/or sulphate salts on the surface of a substrate or within a substrate, the system and/or arrangement comprises:
a) an infrared light emitting source configured to emit infrared light over the whole range of 8 to 14 μm and/or over a range of wavelengths of 8 to 14 μm,
b) a LWIR detecting device configured to detect an intensity of electromagnetic radiation scattered, emitted and/or reflected by the substrate and the amorphous and/or crystalline structure of phosphate and/or sulphate salts; and
c) a control circuitry configured to:
i) actuate and/or activate, e.g. based on providing one or more control signals, the infrared light emitting source to irradiate a substrate comprising an amorphous and/or crystalline structure of phosphate and/or sulphate salts on the surface of the substrate or within the substrate;
ii) acquire and/or capture, using the LWIR detecting device and based on detecting the intensity of electromagnetic radiation scattered, emitted and/or reflected by the substrate and the amorphous and/or crystalline structure of phosphate and/or sulphate salts, a stream of a plurality of temporally consecutive images of the substrate and the amorphous and/or crystalline structure of phosphate and/or sulphate salts irradiated with the infrared light emitting source; and
iii) select, based on processing the acquired stream of images, at least one focused image, in which the amorphous and/or crystalline structure of phosphate and/or sulphate salts is substantially in focus of the LWIR detecting device.

The inventors surprisingly found that if a substrate is provided comprising an amorphous and/or crystalline structure of phosphate and/or sulphate salts on the surface of the substrate and/or within the substrate, this structure can be detected with a LWIR imaging system and/or LWIR imaging arrangement, if the LWIR imaging system/arrangement comprises an infrared light emitting source that emits over the whole wavelength range of 8 to 14 μm, a LWIR detecting device and a control circuitry configured to process a stream of images acquired by means of the LWIR detecting device. More precisely, the inventors have surprisingly found that the LWIR imaging system/arrangement can be used to efficiently and reliably detect an amorphous and/or crystalline structure of phosphate and/or sulphate salts on the surface of a substrate or within a substrate by irradiating a substrate comprising an amorphous and/or crystalline structure of phosphate and/or sulphate salts on the surface of a substrate or within a substrate with an infrared light emitting source that emits over the whole range of 8 to 14 µm and detecting the intensity of electromagnetic radiation scattered, emitted and/or reflected by the substrate and the amorphous and/or crystalline structure of phosphate and/or sulphate salts based on acquiring one or more images with the LWIR detecting device. Additionally, the inventors surprisingly found that based on acquiring a stream of a plurality, i.e. at least two, consecutive images and based on processing these images to select a substantially focused image, the amorphous and/or crystalline structure of phosphate and/or sulphate salts on the surface of a substrate or within a substrate can be reliably and accurately detected. In turn, the overall detection process can be simplified, e.g. requiring a minimum or even no user operation, and a light-weight and compact LWIR imaging system/arrangement can be provided, for example in the form of a handheld, portable or mobile device.

As used herein, light emitted by the substrate may include one or more of light reflected by the substrate, light transmitted through the substrate, light scattered by the substrate and light actively emitted by the substrate, for example by fluorescence and/or phosphorescence. Accordingly, the substrate or at least a part thereof may be irradiated with the at least one infrared light emitting source and the LWIR detecting device may be configured to detect light scattered by, reflected by, actively emitted by, and/or transmitted through the substrate or the at least part thereof.

Further, a picture, pattern, indicia, coating and/or code, which may optionally be comprised by the amorphous and/or crystalline structure of phosphate and/or sulphate salts on the substrate or within the substrate, can be imaged and/or detected clearly, sharp and focused, in an at least partly automated or even fully automated manner. In turn, this may allow to verify, such picture, pattern, indicia, coating and/or code, which may be invisible or at least hardly visible with the human eye, for example for anti-counterfeiting purposes, tracking purposes, authenticity verification, or the like, as described in more detail hereinbelow.

It is to be noted that the amorphous and/or crystalline structure of phosphate and/or sulphate salts on the surface of the substrate or within the substrate may be arranged and/or located on/within a part of the substrate or the entire substrate. Further, it is to be noted that a plurality of amorphous and/or crystalline structures of phosphate and/or sulphate salts may be arranged on the surface of the substrate or within the substrate. Therein, the same or different amorphous and/or crystalline structures of phosphate and/or sulphate salts may be arranged on the surface of the substrate or within the substrate.

Further, it is to be noted that a plurality of amorphous and/or crystalline structures of phosphate and/or sulphate salts may be arranged on the surface of the substrate or within the substrate. Therein, the same or different amorphous and/or crystalline structures of phosphate and/or sulphate salts may be arranged on the surface of the substrate or within the substrate. For example, a plurality of prints, patterns, codes, and/or indicia may be arranged on a substrate, wherein the prints, patterns, codes, and/or indicia can be comprised and/or constituted by the same or different amorphous and/or crystalline structures of phosphate and/or sulphate salts. In an example, an array of prints, patterns, codes, and/or indicia may be arranged on the substrate (and/or a label comprising the substrate) or within the substrate. This can allow an operator to quickly and easily find at least one of the prints, patterns, codes and/or indicia, e.g. because multiple of these are provided at different locations of the substrate. Moreover, a risk of an unreadable print, pattern, code and/or indicia, for example due to damage, can be reduced and/or compensated by providing a plurality of codes, prints, patterns and/or indicia on the substrate or within the substrate.

Further, it is to be noted that any reference to a code hereinabove and hereinbelow is to be construed as comprising a picture, pattern, and/or indicia. Also, any reference to the substrate includes a part and/or portion thereof or the entire substrate.

Substrates such as, for example, papers, sheets, foils, cardboards, polymer films, woven or non-woven polymeric textiles comprising an amorphous and/or crystalline structure of phosphate and/or sulphate salts on the surface of the substrate or within the substrate such that the amorphous and/or crystalline structure of phosphate and/or sulphate salts is not or only hardly detectably by the un-aided human eye are known to the skilled person. The manufacture or application of such substrates with amorphous and/or crystalline structures of phosphate and/or sulphate salts on the surface of the substrate or within the substrate is known to the skilled person and, for example, described in EP3067214 B1. The methods and materials described therein are incorporated herein by reference. If the substrate comprising the amorphous and/or crystalline structure of phosphate and/or sulphate salts is irradiated with infrared light at least over the whole wavelength range of 8 to 14 µm, the intensity of electromagnetic radiation emitted, scattered and/or reflected by the substrate and the amorphous and/or crystalline structure of phosphate and/or sulphate salts can be detected with the inventive LWIR (longwave infrared) imaging system and/or LWIR imaging arrangement. The inventors surprisingly found that by the above-described method and especially by the LWIR imaging system and/or LWIR imaging arrangement, the prints, pictures, patterns, indicia, codes and/or coatings comprised, encoded and/or constituted by the amorphous and/or crystalline structure of phosphate and/or sulphate salts can be reliably detected, in particular without destroying or damaging the substrate and the print or coating. Furthermore, the inventors surprisingly found that by the above LWIR imaging system and/or LWIR imaging arrangement, the electromagnetic radiation emitted, scattered and/or reflected by the amorphous and/or crystalline structure of phosphate and/or sulphate salts can be reliably detected since it does not or not significantly interfere with the substrate, especially if the substrate comprises cellulose. Furthermore, the above LWIR imaging system and/or LWIR imaging arrangement can be provided in small, light, compact and/or transportable form and can, for instance, be operated as a handheld device.

Another aspect of the present disclosure relates to the use an LWIR imaging system and/or LWIR imaging arrangement for acquiring at least one image based on detecting an intensity of electromagnetic radiation scattered, emitted and/or reflected by a substrate comprising an amorphous and/or crystalline structure of phosphate and/or sulphate salts on the surface of the substrate or within the substrate.

Another aspect of the present disclosure relates to the use a LWIR imaging system and/or LWIR imaging arrangement for verifying and/or authenticating a picture, pattern, indicia, and/or code comprised in the amorphous and/or crystalline structure of phosphate salts and/or sulphate salts on the surface of the substrate and/or within the substrate.

In the context of the present disclosure, the LWIR imaging arrangement comprises the LWIR imaging system, as described hereinabove and hereinbelow, and a computer device coupled, mounted and/or affixed to the LWIR imaging system. As described hereinabove and hereinbelow, the computer device may refer to and/or comprise a smartphone, a tablet PC, a mobile phone, a Blackberry, a personal computer (PC), a notebook and/or any other computing device suitable for processing and/or configured to process data of and/or communicate with the LWIR imaging system.

It should be noted that any feature, function, element and/or component of the LWIR imaging system, as described hereinabove and hereinbelow, equally applies to the LWIR imaging arrangement, and vice versa.

Further, in the context of the present disclosure, the control circuitry may refer to a processing electronics, a controller, a control module, a control unit, a control circuit, a control arrangement or the like. The control circuitry may, for instance, comprise one or more processors configured to process one or more signals or data from at least one of the infrared light emitting source, the LWIR detecting device, and optionally a further sensor, such as e.g. a Time-o-Flight distance sensor of the LWIR imaging system.

It should be noted that the control circuitry and/or any functionality and/or configuration described with reference thereto can be implemented in the LWIR imaging system, the computing device of the LWIR imaging arrangement, or both. Accordingly, the control circuitry may at least partly be implemented in the LWIR imaging system and/or the LWIR imaging arrangement. For example, a portion of the control circuitry implemented in the LWIR imaging system may be communicatively coupled to and/or interact with a further portion of the control circuitry implemented in the computing device of the LWIR imaging arrangement. Accordingly, some or all functionalities described hereinabove or hereinbelow with respect to any of the LWIR imaging system and the LWIR imaging arrangement can be implemented in the LWIR imaging system, the computing device of the LWIR imaging arrangement, or both.

According to an embodiment of the present disclosure, the LWIR imaging system comprises a communication interface for interfacing with a corresponding communication interface of the computer device of the LWIR imaging arrangement. Alternatively or additionally, the LWIR imaging arrangement may comprise a communication interface for interfacing with a corresponding communication interface of the LWIR imaging system. The communication interface of the LWIR imaging system and/or the communication interface of the computer device may be configured for wired communication, wireless communication, or both. Alternatively or additionally, the communication interface of the LWIR imaging system and/or the communication interface of the computer device may be configured to exchange data, e.g. image data acquired with the LWIR imaging system, the LWIR detecting device and/or the computer device of the LWIR arrangement. Optionally, a data communication between the LWIR imaging system and the computer device may be a bi-directional communication.

According to an embodiment of the present disclosure, the LWIR imaging system and/or the LWIR imaging arrangement comprises a communication circuitry configured to communicate and/or exchange data with a server. Therein, the server may be located and/or arranged remote from the LWIR imaging system and/or LWIR imaging arrangement. The communication circuitry of the LWIR imaging system and/or the LWIR imaging arrangement may be configured for a wired or wireless communication with the server. By way of example, the communication circuitry may communicate and/or exchange data with the server via a WLAN connection, a WiFi connection, a LAN connection, an Internet connection, a Bus connection, an infrared connection, a Bluetooth connection, a mobile communications network, a telephone communications network or any other suitable connection or communications network allowing to transfer and/or exchange data.

Alternatively or additionally, the computer device may comprise a communication circuitry configured to communicate and/or exchange data with the server. For instance, data may be acquired, provided and/or generated by the LWIR imaging system and transferred and/or transmitted to the computer device, e.g. via communication interfaces of the LWIR imaging system and the computing device. Further, the computer device may be configured to forward, transmit and/or transfer the data acquired, provided and/or generated by the LWIR imaging system to the server. The communication circuitry of the computer device may be configured for a wired or wireless communication with the server. By way of example, the communication circuitry of the computer device may communicate and/or exchange data with the server via a WLAN connection, a WiFi connection, a LAN connection, an Internet connection, a Bus connection, an infrared connection, a Bluetooth connection, a mobile communications network, a telephone communications network or any other suitable connection or communications network allowing to transfer and/or exchange data.

In the context of the present disclosure, the server may refer to a stand-alone server, a server system, a computing system, a server network, a computing network, and/or a cloud-based computing system. Accordingly, the server may comprise one or more data processing devices and/or computing devices. Hence, any reference hereinabove and hereinbelow to a single server includes a plurality of servers.

Optionally, the server or plurality of servers may utilize blockchain technology, for example for authentication, verification, tracking and/or counterfeiting purposes. In other words, a blockchain may be implemented on the server or plurality of servers. Accordingly, one or more aspects of the present disclosure and/or one or more features of one or more of said aspects may be implemented at least partly using one or more blockchains. For this purpose, one or more proprietary (or centralized) blockchains and/or one or more decentralized blockchains may be used, such as for example Ethereum, Solana, Cardano, Quorum, Hyper Ledger Fabric or any other blockchain.

As described in more detail hereinabove and hereinbelow, the amorphous and/or crystalline structure of phosphate salts and/or sulphate salts on the surface of the substrate and/or within the substrate may, in an embodiment, comprise a picture, pattern, indicia, coating and/or code for authenticating an object, item and/or product associated with the substrate. Optionally, the picture, pattern, indicia and/or code may be associated with, may be indicative of, may encode and/or may include a blockchain token, which may allow to digitally track and/or authenticate the object, item and/or product. In an example, the picture, pattern, indicia, coating and/or code may include and/or may be indicative of a contract address, a smart contract address and/or a wallet address of the block chain token.

Optionally, the blockchain token may include or be associated with, for example, a product certificate and/or other information, such as an approval or application certificate by an official authority, e.g. by the Food and Drug Administration or another authority. Further optionally, the blockchain token may be associated with a dynamic list of objects, items and/or products, or a dynamic list of one or more batches of the object, item and/or product.

By scanning the substrate with the LWIR imaging system and/or the LWIR imaging arrangement, the picture, pattern, indicia, coating and/or code may be detected and the corresponding object, product and/or item may be verified and/or authenticated using the blockchain and/or said blockchain token.

As mentioned above, one aspect of the present disclosure relates to a method for detecting an amorphous and/or crystalline structure of phosphate and/or sulphate salts on the surface of a substrate or within a substrate. Therein, an LWIR imaging system and/or arrangement with an infrared light emitting source and an LWIR detecting device is provided. Further, the substrate comprising an amorphous and/or crystalline structure of phosphate and/or sulphate salts on the surface of the substrate or within the substrate is provided and irradiated with the infrared light emitting source. Further, based on or using the LWIR detecting device, a stream of a plurality of temporally consecutive images of the substrate and the amorphous and/or crystalline structure of phosphate and/or sulphate salts irradiated with the infrared light emitting source is acquired. Therein, the stream of the plurality of images may be acquired based on detecting the intensity of electromagnetic radiation scattered, emitted and/or reflected by the substrate and the amorphous and/or crystalline structure of phosphate and/or sulphate salts, e.g. in response to irradiating the substrate with the infrared light emitting source. Moreover, based on processing the acquired stream of images with the control circuitry, at least one focused image is selected by the control-circuitry among the acquired stream of images. For example, among the acquired stream of images, the control circuitry may determine one or more images, in which the substrate with the amorphous and/or crystalline structure of phosphate and/or sulphate salts may be substantially in focus and/or may be substantially located at a focal distance of the LWIR detecting device.

It should be noted that in the context of the present disclosure, the terms "focused image" should be construed broadly and may refer to an image, in which the amorphous and/or crystalline structure of phosphate and/or sulphate salts is substantially in focus of the LWIR detecting device. In other words, an image may be considered as focused image if the substrate with the amorphous and/or crystalline structure of phosphate and/or sulphate salts is substantially located at a focal distance and/or in a focal plane of the LWIR detecting device. "Substantially" may mean that said image was captured while the substrate was located at the focal plane and/or at the focal distance of the LWIR detecting device within a certain range of relative deviation, such as for example within a range of equal or less than 25%, 20%, 15%, 10% or 5% of the focal distance (or of a distance to the focal plane). Depending on the characteristics of the LWIR detecting device as well as depending on the substrate and the amorphous and/or crystalline structure of phosphate and/or sulphate salts, such as e.g. a size thereof, this may mean that the LWIR imaging system (and/or the LWIR imaging arrangement) and the substrate can be spaced apart from one another for acquiring a focused image within several tens of centimeters to several millimeters of the focal distance, while still being able to acquire one or more "focused images".

For example, an image may be considered a "focused image" if the amorphous and/or crystalline structure of phosphate and/or sulphate salts can be sufficiently detected, e.g. sufficiently sharp, for example to allow for a further image analysis and/or processing of the amorphous and/or crystalline structure of phosphate and/or sulphate salts on the substrate or within the substrate by the control circuitry, for example in terms of geometry, shape, form, size, image content, and/or information contained or associated therewith.

Alternatively or additionally, the "focused image" may denote or refer to the most focused image among the acquired images of the stream of images. In an example, the control circuitry of the LWIR detecting device may be configured to determine one or more image parameters of each image of the stream of images and compare the parameter values of different images to determine the image having the highest (or lowest) image parameter among the images of the acquired stream of images. Said image with the highest (or lowest) image parameter may then be selected as "the focused" image. As will be discussed in more detail hereinbelow, the one or more image parameters may include one or more of a sharpness, a non-sharpness, a fuzzyness, and a blurredness of the respective image.

By way of example, the amorphous and/or crystalline structure of phosphate salts and/or sulphate salts on the surface of the substrate and/or within the substrate can comprise a picture, a pattern, a code, a covert code, indicia and/or an overt code which may be hardly visible or invisible for the unaided human eye. In this example, an image may be considered focused if the picture, pattern, code, covert code, indicia and/or overt code is derivable and/or detectable based on analyzing and/or processing the respective image with the control circuitry.

It should be noted that a focal distance of the LWIR detecting device can be fix or can be adjustable. For example, the control circuitry may adjust and/or modify the focal distance of the LWIR detecting device, e.g. during acquiring the stream of images. Accordingly, acquiring the stream of images may comprise adjusting a focal distance of the LWIR detecting device. Alternatively or additionally, a distance between the substrate and the LWIR imaging system may be varied and/or adjusted during acquiring the stream of images, for example by a user or operator of the LWIR imaging system and/or arrangement. Optionally, one or more instructions may be provided by the control circuitry to the user or operator, e.g. on a user interface of the LWIR imaging system and/or arrangement. Such instructions may for example comprise displaying an image of the amorphous and/or crystalline structure of phosphate salts and/or sulphate salts on the surface of the substrate and/or within the substrate, allowing the user to optically determine sharpness of the image and adjust the distance accordingly. Alternatively or additionally, explicit instructions can be provided, e.g. to vary the distance in a certain direction and/or by a certain amount. Alternatively or additionally, one or more acoustic and/or haptic signals can be provided at a respective user interface of the LWIR imaging system and/or LWIR imaging arrangement.

In the context of the present disclosure, "a user interface" of the LWIR imaging system and/or arrangement can refer to or denote any interface for providing a user-perceptible signal, information and/or notification to the user. For example, a user interface may comprise a touch display, a speaker, a microphone, a haptic signaling device, one or more optical signaling devices, one or more LEDs, or the like.

Further, in the context of the present disclosure, the "stream of a plurality of temporally consecutive images" of the substrate may refer to or denote a set of two or more images that were captured and/or acquired at different times or time instants.

Generally, any image or stream of images may be stored on a data storage of the LWIR imaging system and/or the LWIR imaging arrangement in the form of image data. Therein, an image acquired with the LWIR detecting device may be stored in raw format and/or may be (pre-)processed by the control circuitry before storing the corresponding image data.

By way of example, raw image data may be subject to one or more pre-processing steps, such as for example normalization of the raw image data, transformation of the raw image data into binary data, cropping, image segmentation, selection of one or more image areas, or the like.

According to an embodiment, selecting the at least one focused image includes determining and/or deriving one or more image parameters of each image of the acquired stream of images, and comparing the determined one or more image parameters of each image with one or more reference image parameters. Generally, the one or more image parameters and/or the one or more reference image parameters may be indicative of a quality of an image and/or at least one characteristic of the image and/or of a structure visible in the image (e.g. the amorphous and/or crystalline structure of phosphate salts and/or sulphate salts). By determining the one or more image parameters and comparing them to the one or more reference image parameters, it may be reliably and/or automatically determined and/or judged whether the corresponding image is substantially in focus and/or focused. Generally, the one or more reference image parameters may be stored on the LWIR imaging system and/or the LWIR imaging arrangement, e.g. in one or more data storages. Alternatively or additionally, the one or more reference image parameters may be retrieved from another source, such as e.g. a server.

According to an embodiment, the at least one focused image is selected based on determining that the determined one or more image parameters substantially matches the one or more reference image parameters. For example, an image may be selected as focused image if the determined one or more image parameters matches the one or more reference image parameters within a range of relative deviation of less than 25%, 20%, 15%, 10%, or 5%. This may allow to reliably determine which of the images of the stream of images can be selected as focused image.

Accordingly, the one or more reference image parameters may refer to one or more thresholds for the respective image parameter, and the control circuitry may be configured to select an image among the plurality of images of the acquired stream of images as focused image based on determining that one or more thresholds indicated by the one or more reference image parameters are reached, exceeded, not reached or not exceed.

According to an embodiment, the one or more image parameters include at least one of a sharpness, a non-sharpness, a fuzzyness, and a blurredness of the respective image. Alternatively or additionally, the one or more reference image parameters include at least one of a reference sharpness, a reference non-sharpness, a reference fuzzyness, and a reference blurredness. It should be noted, however, that any other image parameter or reference image parameter indicative and/or descriptive of an image quality and/or one or more image characteristics may be utilized.

According to an embodiment, the at least one focused image is selected based on comparing at least two images of the acquired stream of images. By way of example, an image may be selected by the control circuitry as focused image if the control circuitry determines that said image substantially matches one or more other images of the stream of images, in particular one or more images directly following or preceding said image in the stream of images.

According to an embodiment, the at least one focused image is selected based comparing and/or inter-comparing one or more image parameters of at least two images of the acquired stream with one another. This may allow to objectively and quickly compare the at least two images.

According to an embodiment, the amorphous and/or crystalline structure of phosphate salts and/or sulphate salts on the surface of the substrate and/or within the substrate comprises a picture, pattern, code, covert code, indicia, and/or overt code which is hardly visible or invisible for the unaided human eye. For example, the picture, pattern, indicia and/or code may be usable for authenticating an object, item and/or product associated with the substrate comprising the code.

According to an embodiment, the substrate comprises a plurality of amorphous and/or crystalline structures of phosphate and/or sulphate salts, e.g. arranged on the surface of the substrate (and/or part thereof) or within the substrate (and/or part thereof). Therein, the same or different amorphous and/or crystalline structures of phosphate and/or sulphate salts may be arranged on the surface of the substrate or within the substrate. For example, a plurality of prints, patterns, codes, and/or indicia may be arranged on the substrate, wherein each of the pictures, patterns, indicia and/or codes can be comprised by at least one amorphous and/or crystalline structure. Therein, the prints, patterns, codes, and/or indicia can be comprised and/or constituted by the same or different amorphous and/or crystalline structures of phosphate and/or sulphate salts.

In an example, a row, an arrangement, a pattern, a column, a plurality of rows, a plurality of columns, an array and/or a matrix of prints, patterns, codes, and/or indicia may be arranged on the substrate (and/or a label comprising the substrate) or within the substrate, wherein each of the prints, patterns, indicia, and/or codes can be comprised by at least one amorphous and/or crystalline structure of phosphate and/or sulphate salts. Some or all of these prints, patterns, codes, and/or indicia (or the corresponding amorphous and/or crystalline structures) can be identical, or some or all of them can differ from one another. Using a plurality of identical prints, patterns, indicia and/or codes can for example allow an operator to quickly and easily find at least one of the prints, patterns, codes and/or indicia for scanning with the LWIR imaging system and/or LWIR imaging arrangement, e.g. because multiple of these are provided at different locations of the substrate and/or a label comprising the substrate. Moreover, a risk of an unreadable print, pattern, code and/or indicia, for example due to damage, can be reduced and/or compensated by providing a plurality of codes, prints, patterns and/or indicia on the substrate or within the substrate.

According to an embodiment, the stream of images includes one or more images of a picture, pattern, indicia and/or code of a print or coating on the substrate and/or within the substrate, wherein the picture, pattern, indicia and/or code comprises an amorphous and/or crystalline structure of phosphate salts and/or sulphate salts on the surface of the substrate and/or within the substrate. Therein, the picture, pattern, indicia and/or code may be hardly visible or invisible for the human eye and may be revealed and/or detected by means of the LWIR imaging system and/or the LWIR imaging arrangement. In other words, the LWIR imaging system and/or the LWIR imaging arrangement may be configured to detect and/or reveal a picture, pattern, indicia and/or code of a print and/or coating on the substrate and/or within the substrate, wherein the picture, pattern, indicia and/or code comprises an amorphous and/or crystalline structure of phosphate salts and/or sulphate salts on the surface of the substrate and/or within the substrate.

Optionally, the substrate, picture, pattern, indicia and/or code may comprise quantum dots, as described in more detail in the following. Accordingly, the LWIR imaging system and/or the LWIR imaging arrangement may be configured to detect the quantum dots, e.g. based on acquiring the image data, one or more images and/or a stream of images.

In the context of the present disclosure, the picture, pattern, indicia and/or code may refer to and/or comprise, for example, a quick response (QR) code, a one-dimensional code, a two-dimensional code, a bar code, an alphanumerical code, a steganography code, a matrix code, a 2-D matrix code, a linear code, a linear barcode, or the like. For example, such picture, pattern, indicia and/or code may be used to authenticate an object, item and/or product, on which the substrate comprising the picture, pattern, indicia and/or code may be arranged and/or which may be associated with the substrate comprising the picture, pattern, indicia and/or code.

According to an embodiment, the at least one focused image is selected based on processing the acquired stream of images, for example based on processing each of the images of the stream, and based on determining whether the picture, pattern, indicia and/or code, and/or code information indicative of the thereof, is successfully derivable from the respective image of the acquired image stream. This may allow to reliably and quickly determine which image(s) of the stream of images is/are focused.

According to an embodiment, an acquisition time is stored in the LWIR imaging system and/or the LWIR imaging arrangement, e.g. in a data storage or data storage device of the LWIR imaging system and/or the LWIR imaging arrangement, wherein the acquisition time may be indicative of a time instant or time period, at which or during which the respective image was acquired. Optionally, the acquisition time may be transmitted to a server.

According to an embodiment, an acquisition location is stored in the LWIR imaging system and/or the LWIR imaging arrangement, e.g. in a data storage or data storage device of the LWIR imaging system and/or the LWIR imaging arrangement, wherein the acquisition location may be indicative of a geographical position or location, at which the corresponding image was acquired. For example, the LWIR imaging system and/or the LWIR imaging arrangement may comprise a location sensor, such as e.g. a GPS (Global Positioning System) sensor, configured to determine the geographical position or location of the LWIR imaging system and/or the LWIR imaging arrangement. Optionally, the acquisition location may be transmitted to the server.

According to an embodiment, the method further comprises deriving, with the control circuitry, code information from the at least one focused image, the code information being indicative of the picture, pattern, indicia and/or code comprised by the amorphous and/or crystalline structure of phosphate salts and/or sulphate salts on the surface of the substrate and/or within the substrate. Accordingly, the LWIR imaging system and/or the LWIR imaging arrangement is configured to derive, from the acquired image data of the picture, pattern, indicia and/or code, a code information. Therein, the code information may be indicative, representative and/or descriptive of information and/or data encoded (and/or stored) in the picture, pattern, indicia and/or code on the substrate and/or within the substrate.

For instance, the LWIR imaging system may acquire the image data, which may be processed at the LWIR imaging system or optionally be transmitted to the computer device of the LWIR imaging arrangement. The LWIR imaging system and/or the computer device may further, e.g. based on or using a computer program, app and/or software, process the acquired image data and derive the code information therefrom. Optionally, one or more of the acquired image data and/or the code information may be displayed on a display and/or user interface of the computer device, the LWIR imaging system and/or the LWIR imaging arrangement. Alternatively or additionally, the LWIR imaging system, e.g. the control circuitry thereof, may be configured to derive the code information from the acquired image data. Optionally, the code information may be transmitted from the LWIR imaging system to the computer device.

According to an embodiment, the LWIR imaging system and/or the LWIR imaging arrangement is configured to transmit, e.g. via a communication circuitry of the LWIR imaging system and/or a communication circuitry of the LWIR imaging arrangement, the derived code information, e.g. in the form of code data, to a server in order to authenticate the code information, the picture, the pattern and/or the code.

According to an embodiment, a time information is transmitted along with the derived code information from the LWIR imaging system and/or the LWIR imaging arrangement to the server, wherein the time information may be indicative of a time instant or time period, at which or during which the code information was derived by the LWIR imaging system and/or the LWIR imaging arrangement. Alternatively or additionally, the time information may be indicative of a transmission time, at which the derived code information was transmitted to the server. Alternatively or additionally, a location information indicative of a geographical position or location of the LWIR imaging system and/or the LWIR imaging arrangement may be transmitted along with the derived code information. It should be noted that the time information and/or the location information can be transmitted to the server together with the derived code information or sequentially.

According to an embodiment, the method further comprises verifying authenticity of the code based on transmitting, via a communication circuitry of the LWIR imaging system, the derived code information and/or the at least one focused image to a server.

According to an embodiment, wherein verifying authenticity of the code includes receiving and/or retrieving authentication data from the server, the authentication data being indicative of an authenticity of the code and/or the code information. Accordingly, the LWIR imaging system and/or the LWIR imaging arrangement may be configured to receive and/or retrieve, from the server, authentication data. Therein, the authentication data may be indicative of an authenticity of the code information and/or may allow a user of the LWIR imaging system and/or the LWIR imaging arrangement to determine authenticity of the code information. Alternatively or additionally, the authentication data may be indicative of an authenticity of the picture, pattern, indicia and/or code on the substrate. Accordingly, the authentication data may allow a user of the LWIR imaging system and/or the LWIR imaging arrangement to determine authenticity of the picture, pattern, indicia and/or code on the substrate.

Accordingly, the authentication data can include a mere confirmation of whether the code information was successfully verified and/or authenticated at the server. Optionally, the authentication data may include further data and/or information, such as e.g. information and/or data related to an object, item or product associated with the picture, pattern, indicia and/or code, a time information, a location information, a storage information, a storage duration, information related to the user or recipient, a manufacturer information, an initial date of storage, information related to transportation, information related to a transportation service provider, status report information, status information, information about whether the code (picture/pattern/indicia) is active or inactive, and/or any other information.

According to an embodiment, the authentication data comprises data and/or information related to a specification and/or characteristic of an object, item and/or product associated with the code, preferably wherein the data and/or information related to the specification includes one or more of a weight, a composition, a type, a serial number, an identification number, a production date, a manufacturing date, a manufacturing company, a manufacturing site, and a lot number of the object, item and/or product. This may allow a user to quickly confirm consistency between the object, product and/or item, which is currently analyzed and/or scanned with the LWIR imaging system and/or the LWIR imaging arrangement, and the corresponding information and/or data associated therewith according to the server.

According to an embodiment, the authentication data may comprise an authentic and/or genuine image of the picture, pattern, indicia and/or code stored on the server, wherein the LWIR imaging system and/or the LWIR imaging arrangement may be configured to receive and/or retrieve, from the server, the authentic and/or genuine image of the picture, pattern, indicia and/or code, such that a user can compare the actual picture, pattern, indicia and/or code, e.g. as acquired with the LWIR imaging system and/or the LWIR imaging arrangement (and/or as shown in the at least one focused image), with the authentic and/or genuine image, as retrieved and/or received from the server.

For example, the server may comprise a database, in which code information of one or more pictures, patterns, indicia and/or codes is stored, wherein each code, picture, pattern and/or indicia, and/or code information may be associated and/or linked with one or more objects, products and/or items. Upon and/or in response to receiving a code information from the LWIR imaging system and/or the LWIR imaging arrangement, the server may determine the object, item and/or product associated therewith in the database. For authentication purposes, the server may determine, retrieve, and/or derive, e.g. from the database, authentication data for the corresponding object, item and/or product. By way of example, the authentication data may comprise data and/or information related to a specification of the object, item and/or product, such as e.g. a weight, a composition, a type, a serial number, an identification number, a production date, a manufacturing date, a manufacturing company, a manufacturing site, a lot number or any other information related to the specification of the object, item and/or product. In other words, the authentication data may specify, may be indicative of, may be descriptive of and/or may be representative of the object, item and/or product (and/or a manufacturing process thereof).

Further, the server may transmit and/or provide the authentication data to the LWIR imaging system and/or the LWIR imaging arrangement, thereby allowing a user of the LWIR imaging system and/or the LWIR imaging arrangement to determine authenticity of the code information and/or the corresponding object, product and/or item.

By way of example, at least a part of the authentication data and/or the information contained therein may be displayed on a display of the computer device of the LWIR imaging arrangement. A user of the LWIR imaging system and/or the LWIR imaging arrangement may, for example, compare the authentication data and/or the information contained therein as shown on the computer device with the actual product, item and/or object. This may allow the user to comprehensively and reliably determine authenticity of the product, item and/or object.

According to an embodiment, the method further comprises displaying at least one of the images of the acquired image stream, the at least one focused image, the picture, the pattern, the indicia, the code, and/or the code information indicative of the picture, pattern, indicia and/or code on a user interface display of the LWIR imaging system. As noted above, the user interface may comprise a display, a touch display, a speaker, an haptic signalling element, one or more LEDs or any other device for providing one or more acoustic, visual, haptic and/or acousto-visual signals to the user.

According to an embodiment, the method further comprises providing a confirmation signal to a user of the LWIR imaging system upon selecting the at least one focused image and/or upon successfully deriving code information from the at least one focused image. This may allow to notify the user of the successful determination of the code information. Alternatively or additionally, a confirmation signal may be provided to the user upon successful verification of the picture, pattern, indicia and/or code at the server, e.g. based on receiving corresponding authentication data from the server. Such signal may be an acoustic signal, a visual signal, a haptic signal or a combination thereof.

According to an embodiment, the method further comprises determining and/or measuring a distance between the LWIR imaging system and the substrate based on and/or using a Time-of-Flight distance sensor of the LWIR imaging system. Alternatively or additionally, the method may comprise activating or deactivating the LWIR detecting device based on a Time-of-Flight distance sensor of the LWIR imaging system. For example, the LWIR detecting device may be activated to acquire one or more images, if it is determined based on the ToF distance sensor that the substrate is substantially located in the focal plane of the LWIR detecting device.

In the following, various aspects, examples and embodiments of the present disclosure are described, in which the LWIR imaging system and/or LWIR imaging arrangement includes the optional ToF distance sensor. It is noted that all aspects, examples and embodiments of the present disclosure can be combined to advantage.

According to a further aspect of the present disclosure, a method for detecting an amorphous and/or crystalline structure of phosphate and/or sulphate salts on the surface of a substrate or within a substrate, the method comprising the steps of:

i) providing a LWIR imaging system, the LWIR imaging system comprising
   a) an infrared light emitting source that emits over the whole range of 8 to 14 µm,
   b) a LWIR detecting device and
   c) a ToF distance sensor,
ii) providing a substrate comprising an amorphous and/or crystalline structure of phosphate and/or sulphate salts on the surface of the substrate or within the substrate,
ii) irradiating the provided substrate with the infrared light emitting source and
iii) detecting, with the LWIR detecting device and using and/or based on the TOF distance sensor, the intensity of electromagnetic radiation scattered, emitted and/or reflected by the substrate and the amorphous and/or crystalline structure of phosphate and/or sulphate salts.

According to another aspect of the present disclosure, a LWIR imaging system for detecting an amorphous and/or crystalline structure of phosphate and/or sulphate salts on the surface of a substrate or within a substrate is provided, the system comprising:
   a) an infrared light emitting source that emits over the whole range of 8 to 14 µm,
   b) a LWIR detecting device configured to detect the intensity of electromagnetic radiation scattered, emitted and/or reflected by the substrate and the amorphous and/or crystalline structure of phosphate and/or sulphate salts and
   c) a ToF distance sensor configured to determine a distance between the substrate and the LWIR detecting device.

The inventors surprisingly found that if a substrate is provided comprising an amorphous and/or crystalline structure of phosphate and/or sulphate salts on the surface of the substrate and/or within the substrate, this structure can be detected with a LWIR imaging system and using and/or based on optionally using the TOF distance sensor, if the LWIR imaging system comprises an infrared light emitting source that emits over the whole wavelength range of 8 to 14 µm, a LWIR detecting device and an optional ToF distance sensor. More precisely, the inventors have surprisingly found that the LWIR imaging system according to the present disclosure can be used to detect an amorphous and/or crystalline structure of phosphate and/or sulphate salts on the surface of a substrate or within a substrate by irradiating a substrate comprising an amorphous and/or crystalline structure of phosphate and/or sulphate salts on the surface of a substrate or within a substrate with an infrared light emitting source that emits over the whole range of 8 to 14 µm and detecting the intensity of electromagnetic radiation scattered, emitted and/or reflected by the substrate and the amorphous and/or crystalline structure of phosphate and/or sulphate salts due to the irradiation with a LWIR detecting device. Additionally, the inventors surprisingly found that the ToF distance sensor in the LWIR imaging system provides further advantages. According to one embodiment it can be used as a simple to operate focusing mechanism. By this focusing mechanism the pictures or patterns of the prints or coatings on the substrate or within the substrate can be imaged clearly, sharp and focused without complex settings. Furthermore, it can be used to determine and/or measure the distance between the LWIR imaging system and the substrate based on and/or using the ToF distance sensor.

In particular, the optional ToF distance sensor, e.g. after calibration, may allow for the capturing of an image and/or ranges of images being partially and/or completely in focus, out of images captured not only from flat surfaces, but also on distorted, curved or angled surfaces. This is achieved by combing sharp areas taken from several partially sharp areas of several images, captured during the image capturing process. Such image capturing process may be characterized by the set triggering distance. The focus from a physical point of view refers to the image point where light rays originating from a point on the object converge.

Furthermore, the distance between the LWIR imaging system and the substrate may be adjusted based on and/or using the ToF distance sensor. This may be done, for example, by instructing a user and/or providing user instructions to a user to increase or decrease the distance between the LWIR imaging system and the substrate. By such an adjustment the amorphous and/or crystalline structure of phosphate and/or sulphate salts on the substrate or within the substrate is focusable with the LWIR detection device. The method of the present disclosure may comprise another step of focusing the LWIR detecting device onto the substrate based on determining a distance between the LWIR imaging system and the substrate using the ToF distance sensor.

Substrates such as, for example, papers, sheets, foils, cardboards, polymer films, woven or non-woven polymeric textiles comprising an amorphous and/or crystalline structure of phosphate and/or sulphate salts on the surface of the substrate or within the substrate such that the amorphous and/or crystalline structure of phosphate and/or sulphate salts is not or only hardly detectably by the human eye are known to the skilled person. The manufacture or application of such substrates with amorphous and/or crystalline structures of phosphate and/or sulphate salts on the surface of the substrate or within the substrate is known to the skilled person and, for example, described in EP3067214 B1. The methods and materials described therein are incorporated herein by reference. If the substrate comprising the amorphous and/or crystalline structure of phosphate and/or sulphate salts is irradiated with infrared light at least over the whole wavelength range of 8 to 14 µm, the intensity of electromagnetic radiation emitted, scattered and/or reflected by the substrate and the amorphous and/or crystalline structure of phosphate and/or sulphate salts can be detected with the inventive LWIR (longwave infrared) imaging system. The inventors surprisingly found that by the above described method and especially by the LWIR imaging system, the prints or coatings comprising the amorphous and/or crystalline structure of phosphate and/or sulphate salts can be easily detected without destroying or damaging the substrate and the print or coating. Furthermore, the inventors surprisingly found that by the above LWIR imaging system, the electromagnetic radiation emitted, scattered and/or reflected by the amorphous and/or crystalline structure of phosphate and/or sulphate salts can be easily detected since it does not or not significantly interfere with the substrate, especially if the substrate comprises cellulose. Furthermore, the above LWIR imaging system is small, light, compact and/or transportable and can be operated as a handheld device. Additionally the operation of the LWIR imaging system is easily and safe for the operator.

According to another aspect of the present disclosure, the LWIR imaging system is used for detecting the intensity of the contrast of electromagnetic radiation emitted, scattered and/or reflected by a substrate and an amorphous and/or crystalline structure of phosphate and/or sulphate salts, due to the irradiation with the infrared light emitting source. Which is the contrast of the printed area comprising the amorphous and/or crystalline structure of phosphate and/or sulphate salts, versus the non-printed area of the substrate.

According to another aspect of the present disclosure, a LWIR imaging system for detecting an amorphous and/or crystalline structure of phosphate and/or sulphate salts on the surface of a substrate or within a substrate is provided, the system comprising a) an infrared light emitting source that emits over the whole range of 8 to 14 µm configured to irradiate a substrate, b) a LWIR detecting device configured to detect the intensity of electromagnetic radiation scattered, emitted and/or reflected by the substrate and the amorphous and/or crystalline structure of phosphate and/or sulphate salts and c) a ToF distance sensor configured to determine a distance between the substrate and the LWIR detecting device.

According to one embodiment, the method further comprises the step of determining and/or measuring a distance between the LWIR imaging system and the substrate based on and/or using the ToF distance sensor.

According to another embodiment, the method further comprises the step of adjusting a distance between the LWIR imaging system and the substrate based on and/or using the ToF distance sensor.

According to another embodiment, adjusting the distance includes instructing a user and/or providing user instructions to a user to increase or decrease the distance between the LWIR imaging system and the substrate.

According to another embodiment, the distance between the LWIR imaging system and the substrate is adjusted, such that the amorphous and/or crystalline structure of phosphate and/or sulphate salts on the substrate or within the substrate is focusable with the LWIR detection device.

According to another embodiment, the method further comprises focusing the LWIR detecting device onto the substrate based on determining a distance between the LWIR imaging system and the substrate using the ToF distance sensor.

According to another embodiment, the LWIR detecting device is a bolometer or a sensor comprising mercury cadmium telluride and preferably the LWIR detecting device is a bolometer.

According to another embodiment, the LWIR imaging system further comprises at least one focusing/scattering device for focusing and/or scattering the irradiated infrared light from the infrared light emitting source, wherein the at least one focusing or focusing/scattering device is preferably located in the beam path between the infrared light emitting source and the LWIR detecting device.

According to another embodiment, the at least one focusing device is a collimator and/or the at least one focusing/scattering device is a lens.

According to another embodiment, the LWIR imaging system further comprises at least one collecting device for collecting and/or focusing the electromagnetic radiation that will be detected by the LWIR detecting device, wherein the at least one collecting device is preferably located in the beam path between the infrared light emitting source and the LWIR detecting device.

According to another embodiment, the at least one collecting device is an objective, preferably a lens.

According to another embodiment of the present invention, the LWIR imaging system may further comprise at least one filtering device for filtering the electromagnetic radiation that will be detected by the LWIR detecting device, wherein the at least one filtering device is preferably located in the beam path between the infrared light emitting source and the LWIR detecting device and preferably between the objective if present and the LWIR detecting device.

According to another embodiment, the at least one filtering device is an optical filter and preferably
i) a bandpass filter, preferably in the range of 8.8 to 9.3 µm or 10.0 to 10.6 µm or 11.3 to 11.8 µm or
ii) a combination of a long pass and short pass filter, preferably a combination of a long pass filter of 8 µm and a short pass filter of 8.8 µm or a combination of a long pass filter of 10.3 µm and a short pass filter of 10.8 µm, or
iii) a tunable filter, preferably a tunable MEMS Fabry-Perot filter, wherein the tunable filter in the range of 8 to 14 µm has preferably a spectral resolution of 100 nm and below.

According to another embodiment, the ToF distance sensor is located in the beam path between the infrared light emitting source and the LWIR detecting device and preferably is equidistant from the infrared light emitting source and the LWIR detecting device.

According to another embodiment, the LWIR imaging system further comprises a graphical image device, preferably a CCD camera.

According to another embodiment, the LWIR imaging system is located in a housing, preferably in a handheld housing, and the housing is preferably connectable to a computer device, preferably a mobile phone.

According to another embodiment, the housing further comprises a button for activating the LWIR detecting device and/or the graphical image device without direct operation of the computer device.

According to another embodiment, the LWIR imaging system is located in or on a snap-on device that can be mounted on a mobile phone or parts of the LWIR imaging system are located in or on a snap-on device that is mounted on a mobile phone and the remaining parts are located on the mobile phone. Such mobile phone may be referred to as computer device in the present disclosure.

According to another embodiment, the system provides at least two recordings per second of an identical part of the substrate comprising the amorphous and/or crystalline structure of phosphate and/or sulphate salts and combining these pictures in order to reduce the signal to noise ratio.

According to another embodiment, the infrared light emitting source is a Peltier element or a resistance based coil heater, the Peltier element preferably being configured to irradiate the substrate homogeneously.

It should be understood that for the purpose of the present disclosure, the following terms have the following meaning.

An amorphous or non-crystalline structure in the meaning of the present disclosure refers to a structure that lacks the long-range order that is characteristic of a crystals. The crystal or crystalline structure in the meaning of the present disclosure refers to the ordered arrangement of atoms, ions or molecules in a crystalline material. The terms and measurement methods for determining amorphous and crystal structures are known to the skilled person.

A phosphate salt in the meaning of the present disclosure is a compound that comprises phosphate anions and counter cations.

A sulphate salt in the meaning of the present disclosure is a compound that comprises sulphate anions and counter cations.

The term "substrate" in the meaning of the present disclosure refers to an article having an outer surface, preferably a paper, sheet, foil, cardboard, polymer film, woven or non-woven polymeric textile that serves as support for the amorphous and/or crystalline structure of phosphate and/or sulphate salts.

A LWIR detecting device is a detecting device that can detect LWIR. LWIR is the abbreviation for "longwave infrared" or "long wavelength infrared". LWIR refers to a range of 8 to 14 µm, having a frequency of 20 to 37 THz, a photon energy of 155 meV to 89 meV. These photon energy can be calculated from the wavelength by the equation $E=hc/\lambda$, wherein E refers to the photon energy in electron volts, h is the Planck constant, c is the speed of light and $\lambda$ is the wave length in µm.

Electromagnetic radiation (EM radiation or EMR) in the meaning of the present disclosure refers to the waves of the electromagnetic field, propagating (radiating) through space, carrying electromagnetic radiant energy. Radiant energy is the energy of electromagnetic waves. It is a form of energy that can travel through space.

A ToF distance sensor is a sensor that can detect the distance from the sensor to the subject. ToF is the abbreviation for "Time of Flight". The ToF distance sensor employs time-of-flight techniques to resolve the distance between the sensor and the subject for each point of the image, by measuring the round trip time of an artificial light signal provided by a solid state device called VCSEL (Vertical Cavity Surface Emitting Laser).

Where the term "comprising" is used in the present description and claims, it does not exclude other elements. For the purposes of the present disclosure, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present disclosure, a LWIR imaging system for detecting an amorphous and/or crystalline structure of phosphate and/or sulphate salts on the surface of a substrate or within a substrate is provided, the system comprising a) an infrared light emitting source that emits over the whole range of 8 to 14 µm, b) a LWIR detecting device and c) a ToF distance sensor.

In the following details and preferred embodiments of the inventive LWIR imaging system will be set out in more details. It is to be understood that these technical details and embodiments also apply to the inventive use of the LWIR detecting device.

Infrared Light Emitting Source

According to the present disclosure the LWIR imaging system comprises an infrared light emitting source that emits over the whole range of 8 to 14 µm.

The infrared light emitting source that emits over the whole range of 8 to 14 µm is configured to irradiate a substrate.

The infrared light emitting source according to the present disclosure provides infrared light in the whole wavelength range of 8 to 14 µm and additionally may provide infrared light outside this wavelength range. According to one embodiment the infrared light emitting source provides infrared light only in the wavelength range of 8 to 14 µm. According to another embodiment the infrared light emitting source provides infrared light in the whole wavelength range of 8 to 14 µm and additionally in a wavelength range below and/or above said wavelength range. In addition to the infrared light the infrared light emitting source may emit other wavelengths outside the infrared, for example in the visible light spectrum.

Infrared light emitting sources that emit infrared light at least over the whole wavelength range of 8 to 14 µm are known to the skilled person. Infrared light emitting sources that emit infrared light at least over the whole wavelength range of 8 to 14 µm are commercially available for example from Hawkeye Technologies under the trade name IR-1x Series, Axetris under the trade name EMIRS50 or EMIRS200, Helioworks, or Micro-Hybrid (NovalR) under the trade name JSIR350-4 or JSIR350-4-R or JSIR350-4-CB or JSIR350-2.

According to a preferred embodiment, the infrared light emitting source is a Peltier element or a resistance based coil heater. Such devices are known to the skilled person and are commercially available.

A Peltier element in the meaning of the present disclosure may be a device that uses the Peltier effect to create a heat flux at the junction of two different types of materials. Such a Peltier element is, for example, available from Hebei I.T. Shanghai Co., Ltd. having part number (PN) TEC1-12706. It may, for example, have a size of 4×4 cm. According to a preferred embodiment the Peltier element is designed such that it fits in the reader or housing as mentioned below.

According to a preferred embodiment, the Peltier element is configured to irradiate the substrate homogeneously. The inventors surprisingly have found that using such a Peltier element as infrared light emitting source is advantageous since it can irradiate the substrate homogeneously, which means that every relevant part of the substrate is irradiated with the same amount of radiation and, therefore, darker or weaker illuminated areas are avoided. Such a homogeneous irradiation is preferred since it may result in sharper images after detection, which reduces the need for image enhancement, especially useful on uneven surfaces.

A resistance based coil heater in the meaning of the present disclosure is a device that provides heat by converting electrical energy into heat through the process of Joule heating. Such devices are known to the skilled person and are commercially available.

The infrared light emitting source of the LWIR imaging system may be selected depending on the substrate and the phosphate and/or sulphate salt. For example, if the substrate is a paper and the phosphate and/or sulphate salt is printed on the substrate in form of, for example, a 2×2 cm QR code and the infrared light emitting source has a distance to the substrate of 10 cm, the light emitting source may be the EMIRS 200 with the reflector type 3 from Axetris. The print however can also have other dimensions that are smaller or bigger, for example, dimensions of 4×4 cm or 8×8 cm. The print can be also in any shape, for example, round, or in the form of an ellipse or triangular.

LWIR Detecting Device

According to the present disclosure, the LWIR imaging system comprises a LWIR detecting device.

LWIR is the abbreviation for "longwave infrared" or "long wavelength infrared" and is also known as "thermal infrared". LWIR is part of the infrared (IR) spectrum.

Infrared radiation (IR) is electromagnetic radiation with longer wavelengths than those of visible light, and is therefore generally invisible to the human eye. It is also known as infrared light. IR wavelengths extend from the nominal red edge of the visible spectrum at 700 nanometers (frequency 430 THz), to 1 millimeter (300 GHz). The infrared comprises the near infrared (NIR), the short wavelength infrared (SWIR), the mid wavelength infrared (MWIR) and the long wavelength infrared (LWIR). The NIR refers to a range of 0.75 to 1.4 µm, having a frequency of 214 to 400 THz, and a photon energy of 886 to 1653 meV. The SWIR refers to a range of 1.4 to 3 µm, having a frequency of 100 to 214 THz, and a photon energy of 413 to 886 meV. The MWIR refers to a range of 3 to <8 µm, having a frequency of >37 to 100 THz, and a photon energy of >155 to 413 meV. The LWIR refers to a range of 8 to 14 µm, having a frequency of 20 to 37 THz, a photon energy of 155 meV to 89 meV.

Infrared radiation is scattered, emitted, reflected and/or absorbed by molecules when they change their rotational-vibrational movements. It excites vibrational modes in a molecule through a change in the dipole moment and afterwards by the transformation of the adsorbed light to a vibrational force. Infrared spectroscopy examines absorption and transmission of photons in the infrared range and is known to the skilled person.

A LWIR detecting device according to the present disclosure is a detection device that can detect LWIR. Such detecting devices are known to the skilled person and commercially available.

According to one embodiment, the LWIR detecting device is a bolometer or a sensor comprising mercury cadmium telluride and preferably the LWIR detecting device is a bolometer.

A bolometer is a device for measuring the power or intensity of electromagnetic radiation via the heating of a material with a temperature-dependent electrical resistance. A bolometer consists of an absorptive element, such as a thin layer of metal, connected to a thermal reservoir (a body of constant temperature) through a thermal link. The result is that any radiation impinging on the absorptive element raises its temperature above that of the reservoir—the greater the absorbed power, the higher the temperature. The intrinsic thermal time constant, which sets the speed of the detector, is equal to the ratio of the heat capacity of the absorptive element to the thermal conductance between the absorptive element and the reservoir. The temperature change can be measured directly with an attached resistive thermometer, or the resistance of the absorptive element itself can be used as a thermometer. Metal bolometers usually work without cooling. They are produced from thin foils or metal films. Alternatively the bolometer may use a semiconductor or a superconductor absorptive element rather than a metal. Bolometers are known to the skilled person and are commercially available, for example from Seek Thermal, (https://www.thermal.com); Thermal Expert (http://www.i3-thermalexpert.com); Flir, (https://www.flir.com); or Ulis, (https://www.Ulis-ir.com).

Alternatively or additionally, a sensor comprising mercury cadmium telluride (HgCdTe) can be used as LWIR detecting device. HgCdTe or mercury cadmium telluride (also cadmium mercury telluride, MCT, MerCad Telluride, MerCadTel, MerCaT or CMT) is an alloy of cadmium telluride (CdTe) and mercury telluride (HgTe) with a tunable bandgap spanning the shortwave infrared to the very long wave infrared regions. The amount of cadmium (Cd) in the alloy can be chosen so as to tune the optical absorption of the material to the desired infrared wavelength. CdTe is a semiconductor with a bandgap of approximately 1.5 electronvolts (eV) at room temperature. HgTe is a semimetal, which means that its bandgap energy is zero. Mixing these two substances allows one to obtain any bandgap between 0 and 1.5 eV. Such a device is known, for example, from U.S. Pat. No. 5,828,068 A.

The intensity of the scattered, emitted and/or reflected electromagnetic radiation by the substrate and the amorphous and/or crystalline structure of phosphate and/or sulphate salts due to the irradiation with the infrared light emitting source of the LWIR imaging system is detected with the LWIR detecting device. More precisely, when a substrate as mentioned below is irradiated with infrared light at least over the whole wavelength range of 8 to 14 µm, the atoms and molecules of the substrate comprising the amorphous and/or crystalline structure of phosphate and/or sulphate salts on the surface of the substrate or within the substrate are stimulated and, therefore, scatter and/or emit electromagnetic radiation that can be detected with a LWIR detecting device even if the amorphous and/or crystalline structure of phosphate and/or sulphate salts is not or only hardly detectably by the human eye. There are differences in the absorption of the infrared light of amorphous and/or crystalline structures of phosphate and/or sulphate salts and the substrate, especially if the substrate comprises cellulose. These differences can be detected when detecting the intensity of electromagnetic radiation scattered and/or emitted and/or reflected by the substrate and the amorphous and/or crystalline structure of phosphate and/or sulphate. The differences in the absorption occur because the energy (wavelength) and the intensity is determined by the possible vibrational modes in the excited substance, which is dependent on the type of atoms and the atomic arrangements present in the specific substance.

The ToF Distance Sensor

The LWIR imaging system may optionally comprise a ToF distance sensor.

A ToF distance sensor is a sensor that can determine and/or measure the distance from the sensor to the subject. ToF is the abbreviation for "Time of Flight". The ToF distance sensor employs time-of-flight techniques to resolve the distance between the sensor and the subject for each point of the image, by measuring the round trip time of an artificial light signal provided by a solid state device called VCSEL (Vertical Cavity Surface Emitting Laser). The ToF distance sensor may emit and detect between 800 and 1500 nm (in the near infrared NIR), preferably between 815 and 1200 nm, more preferably 830 and 1000 nm and most preferably at about 850 nm. Therefore, the ToF distance sensor does not interact with the infrared light emitting source and the LWIR detecting device of the present disclosure. More precisely, the infrared light emitting source emits over the whole range of 8 to 14 µm which is above the range of 800 to 1500 mm. Furthermore the LWIR detecting device detects at 8 to 14 µm and, therefore, above the range of 800 to 1500 µm.

ToF distance sensors usually comprise an illumination unit, an imaging sensor, imaging optics and processing electronics. The illumination unit illuminates the scene and normally uses infrared light to make the illumination unobtrusive. The imaging sensor can comprise several pixels and each pixel measures the time the light takes to travel from the illumination unit (VCSEL) to the object and back to the focal plane array. Alternatively, the imaging sensor can comprise only one pixel. Several different approaches are used for timing. The imaging optics can comprise one or more lenses and gather the reflected light and images the environment onto the image sensor (focal plane array). Often an optical band-pass filter is present that only passes the light with the same wavelength as the illumination unit. This helps suppress non-pertinent light and reduce noise. The processing electronics drives the ToF sensor so as to, among several features, filter out light of frequencies different from the ones emitted, scattered and/or reflected by the illumination unit but having a similar wavelength (typically the sunlight). By filtering out unwanted wavelengths or frequencies, background light can effectively be suppressed. The processing electronics further include drivers for both the illumination unit and the imaging sensor so that these components can accurately be controlled in synchrony to ensure that an accurate image capture or distance of a single point is performed and that a reliable depthmap of the scene is determined. According to a preferred embodiment, the ToF distance sensor measures the distance to one point, on the substrate.

Several different ToF distance sensors are available, such as RF-modulated light sources with phase detectors, range gated imagers or direct time of flight imagers. RF-modulated light sources with phase detectors work by modulating the outgoing beam with an RF carrier, then measuring the phase shift of that carrier on the receiver side. Range gated imagers have a built-in shutter in the image sensor that opens and closes at the same rate as the light pulses are sent out. Because part of every returning pulse is blocked by the shutter according to its time of arrival, the amount of light received relates to the distance the pulse has traveled. Direct time of flight imagers measure the direct time-of-flight required for a single laser pulse to leave the camera and reflect back onto the focal plane array.

ToF distance sensors are known to the skilled person, for example from US20140240692 A1, WO2015097284 A1, EP3191870 A1 or EP2743724 B1 and are commercially available, for example from, Terabee under the trade name Terabee 3DCAM 80X60 or Teraranger EVO 64PX or from STMicroelectronics under the trade name VL53L1X, VL6180X or VL53LOX or from AMS under the trade name TMF8701 or TMF8801 or from Sony under the trade name IMX456QL.

According to a preferred embodiment, the ToF distance sensor is located in the beam path between the infrared light emitting source and the LWIR detecting device. The "beam path" in the meaning of the present disclosure is the path of the infrared light from the infrared light emitting source to the LWIR detecting device. This beam path can be in the geometrical form of a line. However, by lenses, mirrors and further devices, the beam path can be deflected. Furthermore, the beam path can be deflected by the substrate itself as well as by the amorphous and/or crystalline structure of phosphate and/or sulphate salts on the surface of the substrate or within the substrate.

According to another preferred embodiment, the ToF distance sensor is equidistant from the infrared light emitting source and the LWIR detecting device.

However, the ToF distance sensor can be located at another position in the LWIR imaging system. For example, the ToF distance sensor is located on the extension of the beam path between the infrared light emitting source and the LWIR detecting device. Alternatively, the ToF distance sensor has the same distance from the LWIR detecting device than the infrared light emitting source but is not located in the beam path between the infrared light emitting source and the LWIR detecting device. The ToF distance sensor alternatively is located in the LWIR imaging system such that during illumination of the substrate with the infrared light emitting source of the LWIR imaging system, the ToF distance sensor has an unobstructed view to the illuminated substrate.

The ToF distance sensor can be designed or set such that an acoustic or optic signal is released when the ToF distance sensor has a specific distance from the substrate. This specific distance can be set, after calibration, such that the pictures or patterns of the prints or coatings on the substrate or within the substrate can be detected clearly, sharp and focused with the LWIR detecting device, thereby triggering or executing the image capturing process at a frequency of 1 to 100 Hz, which means taking 1 to 100 images per second. This allows for either accumulating low amounts of images for a set time frame, or for accumulating high amounts of images in a set time frame. This enables for a customized image capturing process as well as fast and efficient data processing of the captured images depending on the origin of the taken images e.g. taken from flat surfaces, but also from distorted, curved or angled surfaces. For example the specific distance from the substrate can be 11.2 cm+/−3 mm. 1 or more, for example, 2, 4, 8, 10, 20 or 40 images can be taken in a set time frame, for example one second. However, also other specific distances below and above are possible and depend on the substrate or geometry of the substrate and the print or pattern. Furthermore, other amounts of images in the set time frame can be taken. Therefore, the ToF distance sensor provides a simple to operate focusing mechanism. This is advantageous since commercial available LWIR detecting devices known to the skilled person do not comprise a focusing device. Therefore, LWIR imaging systems without such a ToF distance sensor have to be focused for each picture/recording individually via the human eye, which is complex, may be afflicted with errors and may provide pictures/recordings that are blurred and fuzzy.

According to one embodiment, the focusing mechanism via the ToF distance sensor is done for every image or picture that is taken with the LWIR imaging system. Alternatively, the ToF distance sensor is used for calibration. More precisely, if the distance between the substrate that comprises the amorphous and/or crystalline structure of phosphate and/or sulphate salts on the surface of that substrate or within that substrate and the LWIR imaging system does not change and also the print or pattern of the amorphous and/or crystalline structure of phosphate and/or sulphate salts on the surface of that substrate or within that substrate has approximately the same size, than the focusing via the ToF distance sensor can be performed for only one time before the first picture or image is taken The inventors surprisingly found that with the inventive LWIR imaging system an amorphous and/or crystalline structure of phosphate and/or sulphate salts on the surface of a substrate or within a substrate can be detected.

According to another embodiment, determining and/or measuring a distance between the LWIR imaging system and the substrate is based on and/or by using the ToF distance sensor. According to another embodiment of the present disclosure determining and/or measuring a distance between the LWIR detection device and the substrate and/or LWIR detection device/LWIR imaging system and the amorphous and/or crystalline structure of phosphate and/or sulphate salts on the surface of a substrate or within a substrate is based on and/or by using the ToF distance sensor.

The distance between the LWIR imaging system and the substrate and/or between the LWIR detection device and the substrate and/or between the LWIR detection device/LWIR imaging system and the amorphous and/or crystalline structure of phosphate and/or sulphate salts on the surface of a substrate or within a substrate can be adjusted based on and/or by using the ToF distance sensor.

Adjusting the distance may include instructing a user and/or providing user instructions to a user to increase or decrease the distance between the LWIR imaging system and the substrate and/or between the LWIR detection device and the substrate and/or between the LWIR detection device/LWIR imaging system and the amorphous and/or crystalline structure of phosphate and/or sulphate salts on the surface of a substrate or within a substrate. The instruction can be done by any devices known to the skilled person, for example via user interface, acoustic or visual or haptic signal.

According to a preferred embodiment, the distance between the LWIR imaging system and the substrate can be adjusted, such that the amorphous and/or crystalline structure of phosphate and/or sulphate salts on the substrate or within the substrate is focusable with the LWIR detection device and/or is substantially in focus or the focal plane of the LWIR detection device.

Furthermore, the ToF distance sensor may be used to focus the LWIR detecting device onto the substrate based on determining a distance between the LWIR imaging system and the substrate.

The Substrate

According to the present disclosure, a substrate is provided comprising an amorphous and/or crystalline structure of phosphate and/or sulphate salts on the surface of the substrate, e.g. partially or entirely covering the substrate, or within the substrate, e.g. within a part of the substrate or within the entire substrate).

Such a substrate comprising the amorphous and/or crystalline structure of phosphate and/or sulphate salts on the surface of that substrate or within that substrate is known to the skilled person. Also the production of such substrates comprising the amorphous and/or crystalline structure of phosphate and/or sulphate salts on the surface of that substrate or within that substrate is known to the skilled person. For example, it may be obtained by providing a substrate wherein the substrate comprises at least one external surface comprising a salifiable alkaline or alkaline earth compound, providing a liquid treatment composition comprising at least one acid, wherein the at least one acid is phosphoric acid and/or sulphuric acid and applying the liquid treatment composition onto the at least one external surface in form of a preselected pattern by inkjet printing to form a hidden pattern. Such a method is, for example, known from EP3067214 B1, which is not limitative to the present invention.

The substrate that serves as support for the amorphous and/or crystalline structure of phosphate and/or sulphate salts and may be opaque, translucent, or transparent.

In this context, it is worthwhile noting that the phosphate and/or sulphate salts of the amorphous and/or crystalline structure can optionally be contained in an ink and/or be provided as mixture or composition comprising pigments. Such ink, mixture and/or composition could be applied to the substrate by deposition and/or printing. This can allow to print the substrate with visible ink and/or pigments, while allowing to include the amorphous and/or crystalline structure of phosphate and/or sulphate salts on the surface of the substrate or within the substrate, for example in the form of a picture, pattern, code, and/or indicia invisible or hardly-visible for the human eye.

According to one embodiment, the substrate is a paper, sheet, foil, cardboard, polymer film, woven, non-woven polymeric textile, preferably a paper or cardboard and most preferably a paper. The substrate can also be a laminate of paper, plastic and/or metal, wherein preferably the plastic and/or metal are in form of thin foils such as for example used in Tetra Pak. However, any other material having a surface suitable for printing, coating or painting on, fixing or immobilizing the amorphous and/or crystalline structure of phosphate and/or sulphate salts may also be used as substrate. Additionally or alternatively, the substrate comprises cellulose or is made of cellulose.

According to a preferred embodiment the substrate comprises cellulose and is a paper, sheet, foil, cardboard, polymer film, woven, non-woven polymeric textile, preferably a paper or cardboard and most preferably is a paper. Preferably, the amount of cellulose in the substrate is above 20 wt.-%, based on the total weight of the substrate comprising an amorphous and/or crystalline structure of phosphate and/or sulphate salts on the surface of the substrate and/or within the substrate, more preferably above 40 wt.-%, even more preferably above 60 wt.-% and most preferably above 80 wt.-% based on the total weight of the substrate comprising an amorphous and/or crystalline structure of phosphate and/or sulphate salts on the surface of the substrate and/or within the substrate.

According to one embodiment, the substrate is paper, sheet, or cardboard. Cardboard may comprise carton board or boxboard, corrugated cardboard, or non-packaging cardboard such as chromoboard, or drawing cardboard. The paper, sheet or cardboard substrate can have a basis weight from 10 to 1 000 g/m$^2$, from 20 to 800 g/m$^2$, from 30 to 700 g/m$^2$, or from 50 to 600 g/m$^2$. According to one embodiment, the substrate is paper, preferably having a basis weight from 10 to 400 g/m$^2$, 20 to 300 g/m$^2$, 30 to 200 g/m$^2$, 40 to 100 g/m$^2$, 50 to 90 g/m$^2$, 60 to 80 g/m$^2$, or about 70 g/m$^2$. The term "basis weight" as used in the present disclosure is determined according to DIN EN ISO 536:1996, and is defined as the weight in g/m$^2$.

According to another embodiment the substrate is a foil. The foil can be a metal foil such as aluminium, copper, tin, or gold foil or a highly-filled polymer foil comprising metals as filler such as aluminium, copper, tin, or gold. The foil can have a thickness from 800 nm to 1 mm, preferably from 100 μm to 0.5 mm or from 200 μm to 0.3 mm.

According to another embodiment, the substrate is a polymer substrate. Suitable polymer materials are, for example, polyethylene, polypropylene, polyvinylchloride, polyesters, polycarbonate resins, or fluorine-containing resins, preferably polypropylene. Examples for suitable polyesters are poly(ethylene terephthalate), poly(ethylene naphthalate) or poly(ester diacetate). An example for a fluorine-containing resins is poly(tetrafluoro ethylene). The polymer substrate may be filled with a mineral filler, an organic pigment, an inorganic pigment, or mixtures thereof. Preferably the polymer substrate is filled with a mineral filler, for example GCC, MCC or PCC.

"Ground calcium carbonate" (GCC) in the meaning of the present disclosure is a calcium carbonate obtained from natural sources, such as limestone, marble, or chalk, and processed through a wet and/or dry treatment such as grinding, screening and/or fractionating, for example, by a cyclone or classifier.

"Modified calcium carbonate" (MCC) in the meaning of the present disclosure may feature a natural ground or precipitated calcium carbonate with an internal structure modification or a surface-reaction product, i.e. "surface-reacted calcium carbonate". A "surface-reacted calcium carbonate" is a material comprising calcium carbonate and water-insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US20120031576 A1, WO2009074492 A1, EP2264109 A1, WO0039222 A1, or EP2264108 A1.

"Precipitated calcium carbonate" (PCC) in the meaning of the present disclosure is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP2447213 A1, EP2524898 A1, EP2371766 A1, EP1712597 A1, EP1712523 A1, or WO2013142473 A1.

According to another embodiment of the present disclosure, the substrate may be a woven or non-woven polymeric textile.

Additionally or alternatively, the substrate comprises cellulose. According to the present disclosure cellulose is an organic compound with the formula $(C_6H_{10}O_5)_n$, a polysaccharide consisting of a linear chain of several hundred to many thousands of β(1→4) linked D-glucose units. Cellulose is an important structural component of the primary cell wall of green plants, many forms of algae and the oomycetes. Cellulose is the most abundant organic polymer on earth and the cellulose content of cotton fiber is 90%, that of wood is 40-50%, and that of dried hemp is approximately 57%. Cellulose is the main component of papers, sheets and cardboard. According to the present disclosure the cellulose may be the neat cellulose or may be chemically modified, for example in the form of carboxymethyl cellulose (CMC). CMC is a cellulose derivative with carboxymethyl groups ($-CH_2-COOH$) bound to some of the hydroxyl groups of the glucopyranose monomers that make up the cellulose backbone. The cellulose may be present in form of a salt, for example a sodium salt such as sodium carboxymethyl cellulose.

According to a preferred embodiment, the substrate is a paper, sheet, or cardboard comprising cellulose and optionally calcium carbonate.

The substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers, wherein the sublayers can have a flat or non-flat structure, e.g. a corrugated structure. Preferably the sublayers of the substrate are made from paper, cardboard, polymer film and/or plastic.

The substrate may be permeable or impermeable for solvents, water, or mixtures thereof. According to one embodiment, the substrate is impermeable for water, solvents, or mixtures thereof. Examples for solvents aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

The substrate comprises an amorphous and/or crystalline structure of phosphate and/or sulphate salts on the surface of the substrate and/or within the substrate.

An amorphous or non-crystalline solid or structure according to the present disclosure is a solid or structure that lacks the long-range order that is characteristic of crystals. An amorphous solid has an internal structure made of interconnected structural blocks, having a high degree of connectivity. Contrary to that the crystal structure comprises ordered arrangement of atoms, ions or molecules in a crystalline material. The ordered structures occur from the intrinsic nature of the constituent particles to form symmetric patterns that repeat along the principal directions of three-dimensional space. Amorphous and non-crystalline structures and measurement methods for determining amorphous and crystalline structures are known to the skilled person. For example, it can be detected by X-ray crystallography whether a structure is amorphous or crystalline.

A phosphate salt in the meaning of the present disclosure is a compound that comprises phosphate anions and counter cations. The phosphate anion is defined as $PO_4^{3-}$ and the cation is inorganic. For example, the phosphate salt may be aluminum phosphate, calcium phosphate, calcium orthophosphate, magnesium phosphate, potassium phosphate, or sodium phosphate. According to a preferred embodiment the phosphate salt is calcium phosphate.

A sulphate salt in the meaning of the present disclosure is a compound that comprises sulphate anions and counter cations. The sulphate anion is defined as $SO_4^{2-}$ and the cation is inorganic. For example, the sulphate salt may be calcium sulphate, copper sulphate, iron sulphate, or magnesium sulphate. According to a preferred embodiment the sulphate salt is calcium sulphate.

The substrate comprises the salts on the surface of the substrate and/or within the substrate.

Preferably, the salts are only present on the surface of the substrate, especially in the form of a coating. For the purpose of the present disclosure, the term "coating" or "coating layer" refers to a layer, covering at least partially or in the form of a pattern the substrate, which is formed, created, prepared etc., from a coating formulation which remains predominantly on one side of the substrate. The coating can be in direct contact with the surface of the substrate or, in case the substrate comprises one or more precoating layers and/or barrier layers, can be in direct contact with the top precoating layer or barrier layer, respectively. The coating formulation may comprise the phosphate and/or sulphate salt directly. Alternatively, the coating formulation may comprise phosphoric acid and/or sulphuric acid and the substrate may comprise calcium and/or magnesium carbonate. When bringing these compounds in direct contact, calcium and/or magnesium phosphate and/or sulphate is obtained.

Alternatively, the salts are only present within the substrate. However, the salts may also be present on the surface of the substrate and within the substrate. The substrate may comprise only an amorphous structure of phosphate salts on the surface of the substrate and/or within the substrate or only a crystalline structure of phosphate salts on the surface of the substrate and/or within the substrate. Alternatively, the substrate may comprise an amorphous and a crystalline structure of phosphate salts on the surface of the substrate and/or within the substrate. Preferably, the phosphate salt is calcium phosphate and more preferably is present on the surface of the substrate.

The substrate may alternatively comprise only an amorphous structure of sulphate salts on the surface of the substrate and/or within the substrate or only a crystalline structure of sulphate salts on the surface of the substrate and/or within the substrate. Alternatively, the substrate may comprise an amorphous and a crystalline structure of sulphate salts on the surface of the substrate and/or within the substrate. Preferably, the sulphate salt is calcium sulphate and more preferably is present on the surface of the substrate.

Alternatively, the substrate comprises an amorphous and/or crystalline structure of calcium phosphate on the surface of the substrate and preferably the calcium phosphate is obtained by coating a substrate that comprises calcium carbonate with phosphoric acid. Furthermore, it is preferred that the substrate is a paper, sheet or cardboard and comprises cellulose.

Alternatively, the substrate comprises an amorphous and/or crystalline structure of calcium sulphate on the surface of the substrate and preferably the calcium sulphate is obtained by coating a substrate that comprises calcium carbonate with sulphuric acid. Furthermore, it is preferred that the substrate is a paper, sheet or cardboard and comprises cellulose.

In addition to the amorphous and/or crystalline structure of phosphate and/or sulphate salts on the surface of the substrate or within the substrate, the substrate may comprise quantum dots. A "quantum dot" (QD) in the meaning of the present disclosure is a polyatomic (preferably nanosized) structure that displays discrete electronic states. Due to their small size, these structures have quantum mechanical properties in agreement with naturally occurring atoms or molecules. Therefore, quantum dots are sometimes referred to as artificial atoms. For example, quantum dots are able to emit light of a specific frequency upon excitation by electricity or light. These frequencies can be precisely tuned by changing their size, shape and material. The quantum dots of the present disclosure are not limited to a specific type or class of quantum dots and, therefore, in one embodiment, the quantum dots may be selected from inorganic based quantum dots such as metal-based quantum dots or carbon quantum dots, organic based quantum dots such as peptide-based quantum dots and mixtures thereof. Preferably the quantum dots are carbon quantum dots. Such quantum dots and the use in substrates is known to the skilled person and, for example, described in WO2018215333.

The substrate may be laminated or coated and preferably may be laminated or coated with a polymer layer, wherein the laminate or coating layer is at least partially transparent over the whole wavelength range of 8 to 14 μm. According to the present disclosure the term "laminate" refers to a sheet of material, which can be applied over a substrate and bonded to the substrate, thereby forming a laminated substrate. Other methods of applying the polymer layer include but are not limited to melt processing techniques, such as for example co-extrusion. Transparent or at least partially transparent means that if the laminate is irradiated with infrared light at least over the whole wavelength range of 8 to 14 μm, the laminate does not scatter and/or emit or only partially scatter and/or emit electromagnetic radiation in said wavelength range. For example the laminate or coating is an infrared transparent polymer matrix, wherein the polymer matrix is a film forming polyolefin, comprising a polymer selected from polyethylene, polypropylene, polybutene-1, polymethylpentene, and cyclo olefin polymers and combinations thereof. Such infrared transparent polymer matrices are known to the skilled person and are described, for example in EP2764320.

The substrate may have different geometries. For example, the substrate may have a flat surfaces. Alternatively, the substrate may have a distorted, curved or angled surfaces.

In step iii) the provided substrate is irradiated with the infrared light emitting source.

The infrared light emitting source that emits over the whole range of 8 to 14 μm of the LWIR imaging system, irradiates light to a substrate that comprises an amorphous and/or crystalline structure of phosphate and/or sulphate salts on the surface of the substrate or within the substrate.

The illumination of the substrate is directly or indirectly with said infrared light emitting source. Direct illumination means that the infrared light of the infrared light emitting source irradiates the substrate directly without further diversion. Indirect illumination means that the infrared light of the infrared light emitting source irradiates the substrate indirectly by diversion, for example with mirrors or reflectors.

Furthermore, illumination of the substrate can be performed in transmission or reflection mode. Transmission mode means that the infrared light of the infrared light emitting source shines through the substrate. In other words the angle between the infrared light emitting source, the substrate and the LWIR detecting device is from >90° to <270°. Reflection mode means that the infrared light of the infrared light emitting source is reflected from the substrate. In other words the angle between the infrared light emitting source, the substrate and the LWIR detecting device is from >0° to 90°.

According to a preferred embodiment the illumination of the substrate is performed in reflection mode and the angle between the infrared light emitting source of the LWIR imaging system, the substrate and the LWIR detecting device of the LWIR imaging system is from 20° to 25°. However, also higher angels are possible, especially if the print is on the surface and not within the substrate.

According to another preferred embodiment the illumination of the substrate is performed in transmission mode and the angle between the infrared light emitting source of the LWIR imaging system, the substrate and the LWIR detecting device of the LWIR imaging system is from >90° to <270°. However, transmission measurements are only possible if the substrate is transparent for LWIR light, e.g. if the infrared light in the range of 8 to 14 μm can shine through the substrate. This is possible, for example, if the substrate is a polymer based film or a cellulose cased film. However, this obviously depends on the intensity of the irradiating device and the thickness of the substrate.

In step iii) the intensity of electromagnetic radiation scattered, emitted and/or reflected by the substrate and the amorphous and/or crystalline structure of phosphate and/or sulphate salts is detected with the LWIR detecting device and using and/or based on the TOF distance sensor.

The term "detecting with" in the meaning of the present disclosure may refer to and/or comprise detecting using and/or based on the TOF distance sensor. The LWIR detecting device and the ToF distance sensor may be used simultaneously or sequentially.

One or more methods of the present disclosure may comprise a further step of determining and/or measuring a distance between the LWIR imaging system and the substrate, based on and/or by using the ToF distance sensor. According to another embodiment of the present disclosure determining and/or measuring a distance between the LWIR detection device and the substrate and/or LWIR detection device/LWIR imaging system and the amorphous and/or crystalline structure of phosphate and/or sulphate salts on the surface of a substrate or within a substrate is based on and/or by using the ToF distance sensor.

According to another embodiment, the method comprises adjusting the distance between the LWIR imaging system and the substrate and/or between the LWIR detection device and the substrate and/or between the LWIR detection device/LWIR imaging system and the amorphous and/or crystalline structure of phosphate and/or sulphate salts on the surface of a substrate or within a substrate based on and/or by using the ToF distance sensor. Adjusting the distance may include instructing a user and/or providing user instructions to a user to increase or decrease the distance between the LWIR imaging system and the substrate and/or between the LWIR detection device and the substrate and/or between the LWIR detection device/LWIR imaging system and the amorphous and/or crystalline structure of phosphate and/or sulphate salts on the surface of a substrate or within a substrate. The instruction can be done by any devices known to the skilled person, for example via user interface, acoustic or visual or haptic signal.

According to a preferred embodiment, the method further comprises adjusting the distance between the LWIR imaging system and the substrate, such that the amorphous and/or crystalline structure of phosphate and/or sulphate salts on the substrate or within the substrate is focusable with the LWIR detection device and/or is substantially in focus or the focal plane of the LWIR detection device.

According to another embodiment, the method may further comprise focusing the LWIR detecting device onto the substrate based on determining a distance between the LWIR imaging system and the substrate.

The inventors surprisingly found that based on the present disclosure it is possible to detect prints or coatings on a substrate or within a substrate that are not or hardly detectable by the human eye, but can be detected easily by an IR detecting device. Furthermore, by the inventive method it is possible to detect prints or coatings on a substrate or within a substrate that do not interfere with the substrate or parts of the substrate. Additionally, the method keeps the substrate as well as the print or coating on the substrate intact and does not destroy them. Furthermore, the method can be easily performed and is safe for the operator.

The inventors surprisingly found that by the LWIR imaging system of the present disclosure an amorphous and/or crystalline structure of phosphate and/or sulphate salts on the surface of a substrate or within a substrate can be detected. More precisely, the substrate comprising the amorphous and/or crystalline structure of phosphate and/or sulphate salts on the surface of the substrate or within the substrate is irradiated with infrared light in the whole wavelength range of 8 to 14 µm and the intensity of the emitted and/or scattered and/or reflected electromagnetic radiation by the substrate and the amorphous and/or crystalline structure of phosphate and/or sulphate salts is detected with the inventive LWIR (longwave infrared) imaging system. The inventors surprisingly found that by the above LWIR imaging system the prints or coatings comprising the amorphous and/or crystalline structure of phosphate and/or sulphate salts can be easily detected without destroying or damaging the substrate and the print or coating. Furthermore, the inventors surprisingly found that by the above LWIR imaging system, the electromagnetic radiation scattered and/or emitted and/or reflected by the amorphous and/or crystalline structure of phosphate and/or sulphate salts can be easily detected since it does not or not significantly interfere with the substrate, especially if the substrate comprises cellulose.

Furthermore, the inventors surprisingly found that it is possible that the distance between the LWIR imaging system and the substrate can be determined and/or measured based on and/or using the ToF distance sensor.

Additionally, the inventors surprisingly found that in a preferred embodiment the ToF distance sensor in the LWIR imaging system provides a simple to operate focusing mechanism. By this focusing mechanism the pictures or patterns of the prints or coatings on the substrate or within the substrate can be imaged clearly, sharp and focused without complex settings.

In another embodiment the method further comprises the step of adjusting a distance between the LWIR imaging system and the substrate based on and/or using the ToF distance sensor, especially such that the amorphous and/or crystalline structure of phosphate and/or sulphate salts on the substrate or within the substrate is focusable with the LWIR detection device and/or is substantially in focus or the focal plane of the LWIR detection device. This is an easy and cheap possibility to adjust distances especially if user instructions are provided and the user adjusts the distance itself.

Furthermore, the above LWIR imaging system is small, light, compact and/or transportable and can be operated as a handheld device. Additionally the operation of the LWIR imaging system is easily and safe for the operator.

According to an embodiment, the LWIR imaging system further comprises a control circuitry configured to control one or more of the infrared light emitting source, the LWIR detecting device, and the ToF distance sensor. Therein, the control circuitry may refer to a processing electronics, a controller, a control module, a control unit, a control circuit, or the like.

The control circuitry, for instance, may comprise one or more processors configured to process one or more signals or data from at least one of the infrared light emitting source, the LWIR detecting device, and the ToF distance sensor.

Optionally, the LWIR imaging system may comprise a data storage, a data storage device and/or a memory. The data storage may be configured to store and/or may store software instructions, which, when executed by the control circuitry and/or one or more processors thereof, instructs the LWIR imaging system to carry out one or more of the functions and/or functionalities of the LWIR imaging system, as described hereinabove and hereinbelow.

By way of example, the LWIR imaging system and/or the control circuitry thereof may be configured to determine, using and/or by means of the ToF distance sensor, a distance between the LWIR imaging system and the substrate and/or a distance between the ToF distance sensor and the substrate. Optionally, the LWIR imaging system and/or the control circuitry may be configured to compare the determined distance with a reference distance.

Therein, the reference distance may refer to a predefined and/or predetermined distance. Alternatively or additionally, the reference distance may be stored in a data storage of the LWIR imaging system and/or the reference distance may be retrieved from another source, e.g. from a server or the like. Further, the reference distance may refer to a distance between the LWIR imaging system and the substrate and/or a distance between the ToF distance sensor and the substrate, at which distance a picture, indicia, a pattern and/or code of a print or coating on the substrate and/or within the substrate can be detected with high accuracy and precision by means of the LWIR imaging system. Accordingly, the reference distance may refer to a distance, at which the picture, pattern, indicia and/or code of the print or coating on the substrate and/or within the substrate can be detected in a sharp, clear and/or focused manner. For instance, the reference distance may range from about 3 cm to about 20 cm, preferably from about 5 cm to about 15 cm, and even more preferably from about 8 cm to about 12 cm. Accordingly, in the context of the present disclosure, the reference distance may refer to a reference distance range.

Further, the LWIR imaging system and/or the control circuitry may be configured to actuate the infrared light emitting source and/or the LWIR detecting device upon determining that the distance between the LWIR imaging system (and/or the ToF distance sensor thereof) and the substrate substantially matches, substantially equals and/or reaches the reference distance or falls within the reference distance range defined by the reference distance. In other words, the LWIR imaging system and/or the control circuitry may be configured to trigger an acquisition of an image of the picture, pattern, indicia and/or code of the print or coating on the substrate and/or within the substrate upon determining that the distance between the LWIR imaging system (and/or the ToF distance sensor thereof) and the substrate substantially matches, substantially equals and/or reaches the reference distance or falls within the reference distance range defined by the reference distance. This may ensure that the picture, pattern, indicia and/or code of the print or coating on the substrate and/or within the substrate can be detected, acquired and/or determined in a focused and sharp manner.

ADDITIONAL EMBODIMENTS

According to one embodiment, the system further comprises at least one focusing/scattering device for focusing and/or scattering the irradiated infrared light from the infrared light emitting source.

A focusing device in the meaning of the present disclosure is a device that can bundle the irradiated infrared light and focuses it to a desired point or place on the substrate. Focusing devices for infrared light are known to the skilled person and are commercially available. According to one embodiment of the present disclosure the irradiated infrared light is only focused by at least one focusing device.

A scattering device in the meaning of the present disclosure is a device that can spread or diversify the irradiated infrared light and redirect or divert it to the substrate. Scattering devices for infrared light are known to the skilled person and are commercially available. According to one embodiment of the present disclosure the irradiated infrared light is only scattered by at least one scattering device.

According to another embodiment, the irradiated infrared light is focused and scattered by at least one focusing device and at least one scattering device. The focusing and scattering function can be combined in one device.

Suitable focusing and scattering devices for infrared light are known to the skilled person and are commercially available.

According to one embodiment, the at least one focusing device is a collimator and/or the at least one focusing/scattering device is a lens.

According to one embodiment the focusing device is a collimator. A collimator in the meaning of the present disclosure is a device that narrows the beams of the irradiated infrared light. To narrow can mean either to cause the direction of motion to become more aligned in a specific direction (i.e., make collimated light or parallel rays), or to cause the spatial cross section of the beam to become smaller (beam limiting device). Collimators suitable for infrared light are known to the skilled person and are commercially available, for example, from Hawkeye Technologies, Axetris, Helioworks, or Micro-Hybrid.

Alternatively, the focusing device is a lens. However, also the scattering device can be a lens. A lens according to the present disclosure is a transmissive optical device that focuses or disperses a light beam by means of refraction. A simple lens consists of a single piece of transparent material, while a compound lens consists of several simple lenses (elements), usually arranged along a common axis. For example, lenses can be made from materials such as glass or plastic or metal, and are, if required, ground and polished or molded to a desired shape. Alternatively lenses can be made from inorganic materials such as ZnSe. Lenses suitable for infrared light are known to the skilled person and are commercially available, for example, from Thermal Expert under the trade name QVGA lens such as "Wide Lens for Q1 (6.8 mm/f/1.3), (http://www.i3-thermalexpert.com/products/t-e-q1-lens) or lenses for uncooled cameras 8-12 microns from OPHIR, (https://www.ophiropt.com/infrared-optics/catalog-infrared-lenses/lenses-for-uncooled-cameras); Long-Wave Infrared (IR) Aspheric Lenses from Edmund Optics, (https://www.edmundoptics.fr/f/mid-wave-and-long-wave-infrared-ir-aspheric-lenses/13931/); Molded IR Aspheric Lenses from Thorlabs Components, (https://www.thorlabs.com/newgrouppage9.cfm?objectgroup_id=4791&pn=390028-F); or lenses from LightPath technologies, (http://www.lightpath.com/product/thermal-imaging-assemblies/).

Additionally or alternatively, the at least one focusing and/or scattering device is preferably located in the beam path between the infrared light emitting source and the LWIR detecting device. In relation to the substrate, the at least one focusing and/or focusing/scattering device is located between the infrared light emitting source and the substrate.

According to another embodiment, the LWIR imaging system further comprises at least one collecting device for collecting and/or focusing the electromagnetic radiation that will be detected by the LWIR detecting device. A collecting device in the meaning of the present disclosure is a device that is suitable for collecting and optionally focusing electromagnetic radiation. Such collecting devices are known to the skilled person and commercially available.

According to one embodiment, the at least one collecting device is an objective and preferably a lens.

In the meaning of the present disclosure an objective is an optical element that gathers electromagnetic radiation scattered and/or emitted or reflected from the substrate and focuses the electromagnetic radiation. Objectives can be a single lens or mirror, or combinations of several optical elements. According to a preferred embodiment the objective is a lens, for example a QVGA lens such as "Wide Lens for Q1 (6.8 mm/f/1.3), commercially available from Thermal Expert (http://www.i3-thermalexpert.com/products/t-e-q1-lens); or lenses for uncooled cameras 8-12 microns from OPHIR, (https://www.ophiropt.com/infrared-optics/catalog-infrared-lenses/lenses-for-uncooled-cameras); Long-Wave Infrared (IR) Aspheric Lenses from Edmund Optics, (https://www.edmundoptics.fr/f/mid-wave-and-long-wave-infrared-ir-aspheric-lenses/13931/); Molded IR Aspheric Lenses from Thorlabs Components, (https://www.thorlabs.com/newgrouppage9.cfm?objectgroup_id=4791&pn=390028-F); or lenses from LightPath technologies, (http://www.lightpath.com/product/thermal-imaging-assemblies/).

Additionally or alternatively, the at least one collecting device is located in the beam path between the infrared light emitting source and the LWIR detecting device. In relation to the substrate, the at least one collecting device is located in the beam path between the substrate and the LWIR detecting device.

According to another embodiment, the LWIR imaging system further comprises at least one filtering device for filtering the electromagnetic radiation that will be detected by the LWIR detecting device. A filtering device in the meaning of the present disclosure is a device that selectively transmits electromagnetic radiation. In other words, depending on the filter some wavelengths of the electromagnetic radiation are blocked and do not transfer through the filter. Filtering devices for electromagnetic radiation are known to the skilled person and are commercially available.

According to one embodiment, the at least one filtering device is an optical filter, preferably i) a bandpass filter or ii) a combination of a long pass and short pass filter or iii) a tunable filter.

A bandpass filter in the meaning of the present disclosure is a device that passes electromagnetic radiation within a certain range and rejects electromagnetic radiation outside that range. Preferably the bandpass filter passes the electromagnetic radiation in the range of 8.8 to 9.3 µm or 10.0 to 10.6 µm or 11.3 to 11.8. Alternatively, two or more bandpass filters can be present, for example one filter that passes the electromagnetic radiation in the range of 8.8 to 9.3 µm and one bandpass filter that passes the electromagnetic radiation in the range of 10.0 to 10.6 µm. Bandpass filters are known to the skilled person, for example from CN202230219 U and from CN103713347 and are commercially available, for example Infrared (IR) Bandpass Filters from Edmund Optics, (https://www.edmundoptics.fr/f/infrared-ir-band-pass-filters/14290); IR Bandpass Filters: 1.75-9.50 µm Central Wavelength from Thorlabs, (https://www.thorlabs.com/newgrouppage9.cfm?objectgroup_id=5871); Mid Infrared Filters: 1.5-20 µm from Electro Optical Components, (http://www.eoc-inc.com/infrared_filters.htm); IR Filters from IRIDIAN Spectral Technologies (https://www.iridian.ca/specialty-filters/ir-filters/); or Bandpass filters from Spectrogon (https://www.spectrogon.com/product-services/optical-filters/spectrogon-ab/).

Alternatively, the filter is a combination of a long pass and short pass filter, for example a long pass filter of 8 µm and a short pass filter of 8.8 µm or a combination of a long pass filter of 10.3 µm and a short pass filter of 10.8 µm. A long pass filter in the meaning of the present disclosure is a filter that attenuates shorter wavelengths and transmits (passes) longer wavelengths. A short pass filter in the meaning of the present disclosure is a filter that attenuates longer wavelengths and transmits (passes) shorter wavelengths. Suitable short and long pass filters are known to the skilled person and are commercially available, for example from Edmund Optics, (https://www.edmundoptics.fr/f/infrared-ir-band-pass-filters/14290); Thorlabs, (https://www.thorlabs.com/newgrouppage9.cfm?objectgroup_id=5871); Electro Optical Componentes, (http://www.eoc-inc.com/infrared_filters.htm); Iridian, (https://www.iridian.ca/specialty-filters/ir-filters/); or Spectrogen, (https://www.spectrogon.com/product-services/optical-filters/spectrogon-ab/).

A tunable filter in the meaning of the present disclosure is a filter that can be adjusted. Preferably the tunable filter is a tunable MEMS Fabry-Perot filter. Additionally or alternatively, the tunable filter can be tuned such that it passes wavelengths in the range of 8 to 14 µm. Preferably the tunable filter has a spectral resolution of 100 nm and below. With such a filter one can make a scan over the whole spectral range with a spectral resolution being as good as the narrowest pass the filter allows for. This means one could obtain for example a spectral image where each pixel would have a full spectrum in the range 8-14 µm. Such images afterwards can be compared to reference spectra with software and the minerals could be read out. Such tunable filters are known to the skilled person and are commercially available, for example from providers mentioned earlier in the description.

Additionally or alternatively, the at least one filtering device is preferably located in the beam path between the infrared light emitting source and the LWIR detecting device and preferably between the objective if present and the LWIR detecting device. In relation to the substrate, the at least one filtering device is located between the substrate and the LWIR detecting device.

According to another embodiment, the LWIR imaging system further comprises a graphical image device. A "graphical image device" in the meaning of the present disclosure is a device that displays the surface of the substrate in the visible range for the human eye. Graphical image devices are known to the skilled person and are commercial available. According to a preferred embodiment the graphical image device is a CCD (charge-coupled device) camera, for example, a Full-Frame-CCD (FF-CCD), a Frame-Transfer-CCD (FT-CCD), a Interline-Transfer-CCD (IT-CCD), or a Frame-Interline-Transfer-CCD (FIT-CCD). If the LWIR imaging system further comprises a graphical image device, then not only the amorphous and/or crystalline structure of phosphate and/or sulphate salts on the surface of a substrate or within a substrate can be detected with the LWIR detecting device but also print patterns or images that are present on the substrate and are visible to the human eye. These print patterns or images can be produced, for example, by ink.

According to another embodiment, the LWIR imaging system further comprises a light emitting source such as a LED, emitting the corresponding excitation wavelength of the corresponding quantum dots or fluorescing material, a standard visible or near infrared band pass filter with a characteristic band pass filter matching the specific fluorescence emission of the quantum dots or other fluorescing material if present in or on the substrate. Such light emitting source are known to the skilled person and are commercially available for example form Thorlabs or other suppliers (https://www.thorlabs.com/newgrouppage9.cfm?objectgroup_id=2814#4475), the standard visible or near infrared band pass filter are known to the skilled person and are commercial available, for example from Edmund optics or Thorlabs the skilled person readily knowing to select the appropriate filter for the corresponding wavelength, which means selecting the correct filter having a centerwavelength (CWL) corresponding to the specific excitation wavelength of the quantum dots or fluorescing material. (https://www.thorlabs.com/newgrouppage9.cfm?objectgroup_id=1001)

According to another embodiment, the system is located in a housing. The housing can have different geometries and can be produced from different materials. Geometries and materials that are suitable for such a housing are known to the skilled person. For example, the housing can be in the form of a handheld housing or in the form of a standing device or in the form of a wall mounted device. A "handheld housing" or "mobile terminal" in the meaning of the present disclosure is a housing or mobile terminal that fits in one hand of a person and can have the form of a pistol or gun, or can be flat like a mobile phone. The handheld housing may have dimensions of a cell phone, for example, dimensions from 5 cm×10 cm×2 cm up to 10 cm×20 cm×7 cm. However, also smaller dimensions are possible. A "standing device" in the meaning of the present disclosure can be larger than a handheld device and can be put up. A "wall mounted device" in the meaning of the present disclosure can be larger than a handheld device and can be mounted to a wall. Such devices may also be called "solid devices". The standing device and the wall mounted device can be in the form of a card reader. For example, they may comprise a slit, and the substrate in the form of cards or sheets can be introduced into this slit. The housing can be made of polymer materials such as polypropylene or polyethylene or can be made of metals such as stainless steel. However, also other materials that are suitable for preparing handheld devices can be used.

According to a preferred embodiment the housing is in the form of a handheld housing. According to another preferred embodiment the housing, preferably the handheld housing is connectable to a computer device, preferably a mobile phone. More precisely a computer device such as a mobile phone or a tablet can be connected with the LWIR imaging system. Alternatively, the computer device can be present within the housing. The connection can be done by wire or wireless, for example by Bluetooth, infrared or Near-field communication (NFC). A computer program or app may be provided on and/or by the computer device, which app or computer program can read out and process the data, e.g. image data, of the LWIR imaging system. Alternatively, however, such computer program or app may also be stored in the LWIR imaging system, e.g. in a data storage thereof. It is especially preferred that the data are converted in a picture format and especially in a multicolor picture, such that the print or coating for example in the form of a pattern on the surface of the substrate or within the substrate which is not or only hardly visible to the neat eye can be seen on the computer device.

According to another embodiment, the housing further comprises a button for activating the LWIR detecting device and/or the graphical image device without direct operation of the computer device.

Such a handheld housing or mobile terminal can, for example, be seen in FIGS. 5, 6 and 7. The dimensions of the handheld housing are about 20 cm×12 cm×5 cm. The handheld housing can have an upper and a lower shell which can be put together. Between these two shells a mobile phone can be inserted. The lower shell comprises the infrared light emitting source that emits over the whole range of 8 to 14 µm, the LWIR detecting device and the optional ToF distance sensor. Furthermore, it comprises an opening for the CCD camera. The CCD camera itself is located on the mobile phone and fits into the opening when the mobile phone is inserted in the handheld housing. The lower shell further comprises a button for activating the LWIR detecting device and/or the graphical image device without direct operation of the computer device. Furthermore, the lower shell comprises an opening for the charging of the mobile phone and the power connection of the mobile phone fits into the opening when the mobile phone is inserted in the handheld housing. The upper shell can comprise an opening for the touch screen of the mobile phone and the touch screen of the mobile phone fits into the opening when the e mobile phone is inserted in the handheld device.

In an exemplified embodiment the infrared light emitting source, the LWIR detecting device and the optional ToF distance sensor are located on the lower shell of the handheld device and preferably side by side. The form of the lower shell can be designed such that the infrared light emitting source and the LWIR detecting device have an angle of 10 degree and the optional ToF distance sensor is located in the middle between the infrared light emitting source and the LWIR detecting device. However, also other angles are possible. For example, the lower shell can be designed such that the infrared light emitting source and the LWIR detecting device have an angle between 5 to 30 degree, preferably 7 to 20 degree and the optional ToF distance sensor is located in the middle between the infrared light emitting source and the LWIR detecting device.

According to another embodiment, the LWIR imaging system is located in or on a snap-on device that can be mounted on a mobile phone or wherein parts of the system are located in or on a snap-on device that is mounted on a mobile phone and the remaining parts are located on the mobile phone.

For example, the infrared light emitting source that emits over the whole range of 8 to 14 µm, the LWIR detecting device and optionally the ToF distance sensor can be located on the snap-on device. However, also the LWIR detecting device can be located on the mobile phone and the infrared light emitting source and the optional ToF distance sensor are located in or on the snap-on device. Alternatively, the ToF distance sensor can be located on the mobile phone and the infrared light emitting source and the LWIR detecting device are located in or on the snap-on device. However, also the infrared light emitting source and the optional ToF distance sensor can be located on the mobile phone and the LWIR detecting device can be located in or on the snap-on device. Alternatively, the infrared light emitting source can be located on the snap-on device and the LWIR detecting device and the optional ToF distance sensor can be located on the mobile phone. Further combinations are also possible.

The snap-on device can have different geometries and can be produced from different materials. Geometries and materials that are suitable for such a snap-on are known to the skilled person. For example, the snap-on device can be in the form of an USB (universal serial bus) device that can be connected to the mobile phone. The snap-on device is preferably much smaller than the mobile phone itself and can have dimensions of about 4 cm×3 cm×1 cm in an exemplified embodiment. The snap-on device can be attached to the mobile phone via the USB plug on the USB device. Preferably the snap-on device is made of polymer materials such as polypropylene or polyethylene and metals such as stainless steel. However, also other materials that are suitable for preparing handheld devices can be used. Such a snap-on device can be seen, for example, in FIG. 8.

Alternatively the snap-on device is in the form of a clip that can be clipped on the mobile phone. The connection to the mobile phone can be done by wire or wireless, for example by Bluetooth, infrared or Near-field communication (NFC).

A computer program or app is needed that can read out and process the data of the LWIR imaging system. It is especially preferred that the data are converted in a picture format and especially in a multicolor picture, such that the print or coating for example in the form of a pattern on the surface of the substrate or within the substrate which is not or only hardly visible to the neat eye can be seen on the computer device.

Use of the LWIR Imaging System

According to the present disclosure the LWIR imaging system can be used for detecting the intensity of the contrast of electromagnetic radiation scattered and/or emitted and/or reflected by a substrate and an amorphous and/or crystalline structure of phosphate and/or sulphate salts, due to the irradiation with the infrared light emitting source.

The inventors surprisingly found that the inventive LWIR imaging system can be used for detecting the electromagnetic radiation scattered and/or emitted and/or reflected by an amorphous and/or crystalline structure of phosphate and/or sulphate salts on the surface of the substrate and/or within the substrate. If a substrate comprising an amorphous and/or crystalline structure of phosphate and/or sulphate salts on the surface of the substrate and/or within the substrate is irradiated with infrared light at least over the whole wavelength range of 8 to 14 µm, electromagnetic radiation is scattered and/or emitted and/or reflected by the substrate and the amorphous and/or crystalline structure of phosphate and/or sulphate salts due to the irradiation. The intensity of the contrast of the electromagnetic radiation can be detected with a LWIR detecting device. The distance between the LWIR imaging system and the substrate can optionally be measured with the ToF distance sensor of the LWIR imaging system.

The infrared light emitting source, the LWIR detecting device and the ToF distance sensor are identical to the above described infrared light emitting source, the LWIR detecting device and the ToF distance sensor. Furthermore the additional embodiments described for the inventive LWIR imaging system also relate to the above mentioned use.

The inventors surprisingly found that prints or coating comprising the amorphous and/or crystalline structure of phosphate and/or sulphate salts on said substrate can be easily detected without destroying or damaging the substrate and the print or coating when using the inventive LWIR imaging system. Furthermore, the inventors surprisingly found that the electromagnetic radiation scattered and/or emitted or reflected by the amorphous and/or crystalline structure of phosphate and/or sulphate salts and by the substrate do not interfere if the inventive LWIR imaging device is used for detecting the scattered and/or emitted and/or reflected electromagnetic radiation, especially if the substrate comprises cellulose. Furthermore, the inventors surprisingly found that by using the inventive LWIR imaging system for detecting an amorphous and/or crystalline structure of phosphate and/or sulphate salts on the surface of a substrate or within a substrate, clearly, sharp and focused images of the pictures or patterns of the prints or coatings on the substrate or within the substrate can be obtained due to the simple to operate focusing mechanism of the optional ToF distance sensor.

When the LWIR imaging system is used for detecting the electromagnetic radiation scattered and/or emitted and/or reflected by an amorphous and/or crystalline structure of phosphate and/or sulphate salts on the surface of the substrate and/or within the substrate, the system can provide one or more recordings per second of a similar part of the substrate comprising the amorphous and/or crystalline structure of phosphate and/or sulphate salts. According to a preferred embodiment, when the LWIR imaging system is used for detecting the electromagnetic radiation scattered and/or emitted and/or reflected by an amorphous and/or crystalline structure of phosphate and/or sulphate salts on the surface of the substrate and/or within the substrate, the system provides at least two recordings per second of a similar part of the substrate comprising the amorphous and/or crystalline structure of phosphate and/or sulphate salts and combines these pictures in order to reduce the signal to noise ratio. "A similar part of the substrate" in the meaning of the present disclosure means that there is an overlap of at least 75%, more preferably 80% and most preferably 90% of the area of the two recordings. "At least" in the meaning of the present disclosure means that two or more recordings per second are provided, for example, four, six or eight recordings per second. These recordings are combined in a computer program or app. The more recordings per second can be provided the better the signal to noise ratio can be reduced.

Preferred LWIR imaging systems are described in the examples and the figures.

The scope and interest of the present disclosure will be better understood based on the following figures and examples which are intended to illustrate certain embodiments of the present disclosure and are non-limitative.

In the following, various exemplary and/or illustrative embodiments and/or further aspects of the present disclosure are described. It should be noted that any embodiment of any aspect of the present disclosure can be combined with any other embodiment of the same aspect and/or with any other embodiment of any other aspect of the present disclosure.

According to a further aspect of the present disclosure, there is provided an LWIR imaging arrangement comprising an LWIR imaging system, as described hereinabove and hereinbelow, and a computer device coupled, mounted and/or affixed to the LWIR imaging system. As described hereinabove and hereinbelow, the computer device may refer to and/or comprise a smartphone, a tablet PC, a mobile phone, a Blackberry, a personal computer (PC), a notebook and/or any other computing device suitable for processing and/or configured to process data of the LWIR imaging system.

It should be noted that any feature, function, element and/or component of the LWIR imaging system, as described hereinabove and hereinbelow, equally applies to the LWIR imaging arrangement, and vice versa.

According to an embodiment of the present disclosure, the LWIR imaging system (and/or the LWIR imaging arrangement) comprises a communication interface interfacing with a corresponding communication interface of the computer device. The communication interface of the LWIR imaging system and/or the communication interface of the computer device may be configured for wired communication, wireless communication, or both. Alternatively or additionally, the communication interface of the LWIR imaging system and/or the communication interface of the computer device may be configured to exchange data, e.g. image data acquired with the LWIR image system. Optionally, a data communication between the LWIR imaging system and the computer device may be a bi-directional communication.

According to an embodiment of the present disclosure, the LWIR imaging system (and/or the LWIR imaging arrangement) comprises a communication circuitry configured to communicate and/or exchange data with a server. Therein, the server may be located and/or arranged remote from the LWIR imaging system. The communication circuitry of the LWIR imaging system may be configured for a wired or wireless communication with the server. By way of example, the communication circuitry of the LWIR imaging system may communicate and/or exchange data with the server via a WLAN connection, a WiFi connection, a LAN connection, an Internet connection, a Bus connection, an infrared connection, a Bluetooth connection, a mobile communications network, a telephone communications network or any other suitable connection or communications network allowing to transfer and/or exchange data.

Alternatively or additionally, the computer device may comprise a communication circuitry configured to communicate and/or exchange data with the server. For instance, data may be acquired by the LWIR imaging system and transferred and/or transmitted to the computer device, e.g. via communication interfaces of the LWIR imaging system and the computing device. Further, the computer device may be configured to forward, transmit and/or transfer the data acquired by the LWIR imaging system to the server. The communication circuitry of the computer device may be configured for a wired or wireless communication with the server. By way of example, the communication circuitry of the computer device may communicate and/or exchange data with the server via a WLAN connection, a WiFi connection, a LAN connection, an Internet connection, a Bus connection, an infrared connection, a Bluetooth connection, a mobile communications network, a telephone communications network or any other suitable connection or communications network allowing to transfer and/or exchange data.

In the context of the present disclosure, the server may refer to a stand-alone server, a server system, a computing system and/or a cloud-based computing system. Accordingly, the server may comprise one or more data processing devices.

According to an embodiment of the present disclosure, the LWIR imaging system and/or the LWIR imaging arrangement is configured to acquire image data, e.g. in the form of one or more images, of a picture, pattern, indicia and/or code of a print or coating on the substrate and/or within the substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following. Accordingly, the LWIR imaging system and/or the LWIR imaging arrangement may be configured to detect the quantum dots, e.g. based on acquiring the image data. Therein, the picture, pattern, indicia and/or code may be hardly visible or invisible for the human eye and may be revealed and/or detected by means of the LWIR imaging system and/or the LWIR imaging arrangement. In other words, the LWIR imaging system and/or the LWIR imaging arrangement may be configured to detect and/or reveal a picture, pattern, indicia and/or code of a print or coating on the substrate and/or within the substrate, wherein the picture, pattern, indicia and/or code comprises an amorphous and/or crystalline structure of phosphate salts and/or sulphate salts on the surface of the substrate and/or within the substrate.

In the context of the present disclosure, the picture, pattern, indicia and/or code may refer to and/or comprise, for example, a quick response (QR) code, a two-dimensional code, a bar code, an alphanumerical code, a stenography code or the like. For example, such picture, pattern, indicia and/or code may be used to authenticate an object, item and/or product, on which the substrate comprising the picture, pattern, indicia and/or code may be arranged and/or which may be associated with the substrate comprising the picture, pattern, indicia and/or code.

According to an embodiment of the present disclosure, an acquisition time is stored in the LWIR imaging system and/or the LWIR imaging arrangement, e.g. in a data storage or data storage device of the LWIR imaging system and/or the LWIR imaging arrangement, wherein the acquisition time may be indicative of a time instant or time period, at which or during which the image data were acquired. Optionally, the acquisition time may be transmitted to the server.

According to an embodiment of the present disclosure, an acquisition location is stored in the LWIR imaging system and/or the LWIR imaging arrangement, e.g. in a data storage or data storage device of the LWIR imaging system and/or the LWIR imaging arrangement, wherein the acquisition location may be indicative of a geographical position or location, at which the image data were acquired. For example, the LWIR imaging system and/or the LWIR imaging arrangement may comprise a location sensor, such as e.g. a GPS (Global Positioning System) sensor, configured to determine the geographical position or location of the LWIR imaging system and/or the LWIR imaging arrangement. Optionally, the acquisition location may be transmitted to the server.

According to an embodiment of the present disclosure, the LWIR imaging system and/or the LWIR imaging arrangement is configured to derive, from the acquired image data of the picture, pattern, indicia and/or code, a code information. Therein, the code information may be indicative, representative and/or descriptive of the picture, pattern, indicia and/or code on the substrate and/or within the substrate. Generally, the code information may be stored and/or encoded in the picture, pattern, indicia and/or code on the substrate and/or within the substrate.

For instance, the LWIR imaging system may acquire the image data, which may then be transmitted to the computer device. The computer device may further, e.g. based on or using a computer program, app and/or software, process the acquired image data and derive the code information therefrom. Optionally, one or more of the acquired image data and/or the code information may be displayed on a display of the computer device. Alternatively or additionally, the LWIR imaging system, e.g. a control circuitry thereof, may be configured to derive the code information from the acquired image data. Optionally, the code information may be transmitted from the LWIR imaging system to the computer device.

According to an embodiment of the present disclosure, the LWIR imaging system and/or the LWIR imaging arrangement is configured to transmit, e.g. via a communication circuitry of the LWIR imaging system and/or a communication circuitry of the LWIR imaging arrangement, the derived code information, e.g. in the form of code data, to a server in order to authenticate the code information, the picture, the pattern and/or the code.

According to an embodiment of the present disclosure, a time information is transmitted along with the derived code information from the LWIR imaging system and/or the LWIR imaging arrangement to the server, wherein the time information may be indicative of a time instant or time period, at which or during which the code information was derived by the LWIR imaging system and/or the LWIR imaging arrangement. Alternatively or additionally, the time information may be indicative of a transmission time, at which the derived code information was transmitted to the server. Alternatively or additionally, a location information indicative of a geographical position or location of the LWIR imaging system and/or the LWIR imaging arrangement may be transmitted along with the derived code information. It should be noted that the time information and/or the location information can be transmitted to the server together with the derived code information or sequentially.

According to an embodiment of the present disclosure, the LWIR imaging system and/or the LWIR imaging arrangement is configured to receive and/or retrieve, from the server, authentication data. Therein, the authentication data may be indicative of an authenticity of the code information and/or may allow a user of the LWIR imaging system and/or the LWIR imaging arrangement to determine authenticity of the code information. Alternatively or additionally, the authentication data may be indicative of an authenticity of the picture, pattern, indicia and/or code on the substrate. Alternatively or additionally, the authentication data may allow a user of the LWIR imaging system and/or the LWIR imaging arrangement to determine authenticity of the picture, pattern, indicia and/or code on the substrate. Optionally, also a time information may be received by the LWIR imaging system and/or the LWIR imaging arrangement along with the authentication data.

According to an embodiment of the present disclosure, the authentication data may comprise an authentic and/or genuine image of the picture, pattern, indicia and/or code stored on the server, wherein the LWIR imaging system and/or the LWIR imaging arrangement may be configured to receive and/or retrieve, from the server, the authentic and/or genuine image of the picture, pattern, indicia and/or code from the server, such that a user can compare the actual picture, pattern, indicia and/or code, e.g. as acquired with the LWIR imaging system and/or the LWIR imaging arrangement, with the authentic and/or genuine image, as retrieved and/or received from the server.

For example, the server may comprise a database, in which code information of one or more pictures, patterns, indicia and/or codes is stored, wherein each picture, pattern, indicia and/or code or code information may be associated and/or linked with one or more objects, products and/or items. Upon and/or in response to receiving a code information from the LWIR imaging system and/or the LWIR imaging arrangement, the server may determine the object, item and/or product associated therewith in the database. For authentication purposes, the server may determine, retrieve, and/or derive, e.g. from the database, authentication data for the corresponding object, item and/or product. By way of example, the authentication data may comprise data and/or information related to a specification of the object, item and/or product, such as e.g. a weight, a composition, a type, a serial number, an identification number, a production date, a manufacturing date, a manufacturing company, a manufacturing site, a lot number or any other information related to the specification of the object, item and/or product. In other words, the authentication data may specify, may be indicative of, may be descriptive of and/or may be representative of the object, item and/or product (and/or a manufacturing process thereof).

Further, the server may transmit and/or provide the authentication data to the LWIR imaging system and/or the LWIR imaging arrangement, thereby allowing a user of the LWIR imaging system and/or the LWIR imaging arrangement to determine authenticity of the code information and/or the corresponding object, product and/or item.

By way of example, at least a part of the authentication data and/or the information contained therein may be displayed on a display of the computer device of the LWIR imaging arrangement. A user of the LWIR imaging system and/or the LWIR imaging arrangement may then, for example, compare the authentication data and/or the information contained therein as shown on the computer device with the actual product, item and/or object. This may allow the user to comprehensively and reliably determine authenticity of the product, item and/or object.

In the following, an exemplary use case for the LWIR imaging system and/or the LWIR imaging arrangement is described. A label comprising the substrate with the picture, pattern, indicia and/or code printed or coated thereon may be provided, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following. The picture, pattern, indicia and/or code may be unique and may have an arbitrary code information stored therein or associated therewith. The label may then be arranged, attached and/or affixed to a product, item and/or object. Optionally, the picture, pattern, indicia, code and/or the code information may be activated on the server, e.g. based on storing the code information in the server's database and based on associating and/or linking the product, item and/or object with the code information in the database. In order to determine authenticity of the product, item and/or object, a user may scan the label with the LWIR imaging system and/or the LWIR imaging arrangement, and the image data of the picture, pattern, indicia and/or code may be generated and/or acquired. Further, the code information may then be derived from the image data by means of the LWIR imaging system and/or the LWIR imaging arrangement, e.g. with the control circuitry of the LWIR imaging system and/or with the computer device of the LWIR imaging arrangement. The derived code information may then be transmitted from the LWIR imaging system and/or the LWIR imaging arrangement to the server, and the server may transmit the authentication data for the corresponding product, item and/or object to the LWIR imaging system and/or the LWIR imaging arrangement. Optionally, the user may visually inspect the product, item and/or object and compare its specification with the at least part of the authentication data as shown and/or displayed on the computer device of the LWIR imaging arrangement. This allows to reliably determine and/or detect authenticity of the product, item and/or object. Further, as the picture, pattern, indicia and/or code on the label and/or on the substrate thereof is invisible to the human eye, the picture, pattern, indicia and/or code cannot be modified or altered by unauthorized persons, at least not without destroying the picture, pattern, indicia and/or code. Moreover, as the code information of the picture, pattern, indicia and/or code is stored in the server's database and the corresponding authentication data are retrieved by the LWIR imaging arrangement from the server, the association between the code information and the product, item and/or object cannot be altered. Accordingly, a failsafe authentication method or system can be provided, e.g. allowing to ensure correct manufacturing and distribution of any object, item and/or product across or over an entire supply chain from the manufacturer to the customer. In turn, this allows a customer, e.g. who purchased a product, item and/or object, to reliably determine authenticity of the product, item and/or object back to the manufacturer.

Further, any user action of a user of the LWIR imaging system and/or the LWIR imaging arrangement may be timestamped with a time stamp and/or a time information may be associated therewith by the LWIR imaging system and/or the LWIR imaging arrangement, wherein the corresponding time information and/or the time stamp for each user action may be provided and/or transmitted to the server. In other words, the LWIR imaging system and/or the LWIR imaging arrangement may be configured to determine for each user action a time information and/or a time stamp indicative of when the respective user action took place and/or was performed. The time information and/or the time stamp for each user action may be stored in the LWIR imaging system and/or the LWIR imaging arrangement, e.g. in a data storage and/or data storage device thereof. Alternatively or additionally, the time information and/or the time stamp for each user action may be transmitted to the server. Optionally, the server may store any time information and/or time stamp transmitted by the LWIR imaging system and/or the LWIR imaging arrangement.

Alternatively or additionally, the LWIR imaging system and/or the LWIR imaging arrangement may be configured determined a geographic position or location upon each user action or for each user action. The geographic position or location may be indicative of the geographical position or location of the LWIR imaging system and/or the LWIR imaging arrangement, at which the user action took place. The geographic position or location for each user action may be stored in the LWIR imaging system and/or the LWIR imaging arrangement, e.g. in a data storage and/or data storage device thereof. Alternatively or additionally, the geographic position or location for each user action may be transmitted to the server. Optionally, the server may store, for each user action, the geographic position or location transmitted by the LWIR imaging system and/or the LWIR imaging arrangement.

Possible user actions may, for example, be the acquisition of image data, an activation of a picture, patter, indicia and/or code on the server, the transmission of the derived code information to the server, the reception of authentication data from the server, the display of at least a part of the authentication data on the LWIR imaging system and/or the LWIR imaging arrangement, or any other user action.

Optionally, for communicating with the server, for transmitting any data to the server, such as e.g. the code information, and/or for receiving any data from the server, such as e.g. the authentication data, the user may authenticate himself, the LWIR imaging system and/or the LWIR imaging arrangement at the server. Such authentication can, for example, be done by logging into a user account on the server, by using a fingerprint on the LWIR imaging system and/or the LWIR imaging arrangement, or by using any other authentication method, such as e.g. facial recognition. For this purpose, the server may store one or more user accounts, wherein each user account may be associated with a user. For example, the user may be required to authenticate himself, the LWIR imaging system and/or the LWIR imaging arrangement at the server at each user action and/or for each user action.

Optionally, the LWIR imaging system and/or the LWIR imaging arrangement may be configured for dual code authentication. For instance, a visible code, i.e. a code visible to the human eye, such as e.g. a visible bar code, QR code, alphanumerical code and/or steganographical code, can be arranged and/or printed on the substrate and/or a further substrate. The visible code and/or code information thereof may be associated with the picture, pattern, indicia and/or code that comprises the amorphous and/or crystalline structure of phosphate salts and/or sulphate salts. Optionally, the substrate, picture, pattern, indicia and/or code may comprise quantum dots, as described above and in the following. The LWIR imaging system and/or the LWIR imaging arrangement may further be configured to capture and/or acquire an image of the visible code. Code information associated with the visible code may then be determined and compared with the code information associated with, stored in and/or encoded by the picture, pattern, indicia and/or code on the substrate that comprises the amorphous and/or crystalline structure of phosphate salts and/or sulphate salts. Such comparison can be conducted by the LWIR imaging system and/or the LWIR imaging arrangement. Alternatively or additionally, the code information of the visible code may be transmitted by the LWIR imaging system and/or the LWIR imaging arrangement to the server, and the server may compare the code information of the visible code with the code information of the picture, pattern, indicia and/or code on the substrate that comprises the amorphous and/or crystalline structure of phosphate salts and/or sulphate salts. Optionally, an authentication signal may be transmitted from the server to the LWIR imaging system and/or to the LWIR imaging arrangement, which authentication signal may indicate that both code information match each other and/or are associated to the same item, object and/or product.

A further aspect of the present disclosure relates to a server for determining authenticity of a product, item and/or object.

According to an embodiment of the present disclosure, the server is configured to receive, from an LWIR imaging system and/or an LWIR imaging arrangement, code information indicative, representative and/or descriptive of a picture, pattern, indicia and/or code on a substrate and/or within the substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following, and the code information may be indicative thereof.

According to an embodiment of the present disclosure, the server is configured to compare the code information received from the LWIR imaging system and/or the LWIR imaging arrangement, with code information stored in a database of the server. Further, the server may be configured to, based on the comparison, determine authentication data indicative of an authenticity of the code information and/or allowing a user of an LWIR imaging system and/or the LWIR imaging arrangement to determine authenticity of the code information (and/or the product, item and/or object the code information is associated with). For example, the authentication data may comprise data and/or information related to a specification of the object, item and/or product, such as e.g. a weight, a composition, a type, a serial number, an identification number, a production date, a manufacturing date, a manufacturing company, a manufacturing site, a lot number or any other information related to the specification of the object, item and/or product. In other words, the authentication data may specify, may be indicative of, may be descriptive of and/or may be representative of the object, item and/or product and/or a manufacturing process thereof.

According to an embodiment of the present disclosure, the server is configured to send, transmit, and/or provide the authentication data to the LWIR imaging system and/or the LWIR imaging arrangement.

A further aspect of the present disclosure relates to an authentication system comprising an LWIR imaging arrangement, as described hereinabove and hereinbelow, and a server, as described hereinabove and hereinbelow.

It should be noted that any feature, function, element and/or component of the LWIR imaging system, the LWIR imaging arrangement and/or the server, as described hereinabove and hereinbelow, equally applies to the authentication system, as described hereinabove and hereinbelow, and vice versa.

A further aspect of the present disclosure relates to a method of authenticating a picture, pattern, indicia and/or code on a substrate and/or within the substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following. The method comprises the following steps:

acquiring, with an LWIR imaging system and/or an LWIR imaging arrangement, image data of the picture, pattern, indicia and/or code, e.g. based on illuminating the picture, pattern, indicia and/or code with the infrared light emitting device;

deriving and/or determining, based on processing the acquired image data with the LWIR imaging system and/or the LWIR imaging arrangement, code information indicative, representative and/or descriptive of the picture, pattern, indicia and/or code on the substrate and/or within the substrate; and transmitting and/or providing, with the LWIR imaging system and/or the LWIR imaging arrangement, the derived code information to a server.

It should be noted that any feature, function, element and/or step of the method, as described hereinabove and hereinbelow, equally applies to the LWIR imaging system, the LWIR imaging arrangement, the server and/or the authentication system, as described hereinabove and hereinbelow, and vice versa.

According to an embodiment of the present disclosure, the method further comprises retrieving and/or receiving, with the LWIR imaging system and/or the LWIR imaging arrangement, authentication data from the server, the authentication data being indicative of an authenticity of the code information and/or allowing a user of the LWIR imaging system and/or the LWIR imaging arrangement to determine authenticity of the code information. For example, the authentication data may comprise data and/or information related to a specification of the object, item and/or product, such as e.g. a weight, a composition, a type, a serial number, an identification number, a production date, a manufacturing date, a manufacturing company, a manufacturing site, a lot number or any other information related to the specification of the object, item and/or product.

According to an embodiment of the present disclosure, the method further comprises displaying at least a part of the authentication data on a display of a computer device of the LWIR imaging arrangement.

According to an embodiment of the present disclosure, the method further comprises receiving, by the server, code information from the LWIR imaging system and/or the LWIR imaging arrangement. The method may further comprise determining a product, item, object and/or code information associated therewith and stored in a database of the server based on comparing the code information received from the LWIR imaging system and/or the LWIR imaging arrangement with the code information stored in the database.

According to an embodiment of the present disclosure, the method further comprises printing and/or applying the picture, pattern, indicia and/or code on a substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following.

According to an embodiment of the present disclosure, the method further comprises activating, on and/or with the server, the picture, pattern, indicia, code and/or the code information based on storing the code information in the server's database and/or based on associating the product, item and/or object with the code information in the database.

In the following, illustrative configurations of an LWIR imaging system and/or an LWIR imaging arrangement according to an aspect of the present disclosure are described.

Configuration 1: An LWIR imaging arrangement, comprising an LWIR imaging system and a computer device coupled, mounted and/or affixed to the LWIR imaging system.

Configuration 2: The LWIR imaging arrangement according to configuration 1, wherein the LWIR imaging system comprises a communication interface interfacing with a corresponding communication interface of the computer device.

Configuration 3: The LWIR imaging arrangement according to any of configurations 1 or 2, wherein the LWIR imaging system, the LWIR imaging arrangement and/or the computer device comprises a communication circuitry configured to communicate and/or exchange data with a server.

Configuration 4: The LWIR imaging arrangement according to any of configurations 1 to 3, wherein the LWIR imaging system and/or the LWIR imaging arrangement is configured to acquire image data, e.g. in the form of one or more images, of a picture, pattern, indicia and/or code of a print or coating on the substrate and/or within the substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following.

Configuration 5: The LWIR imaging arrangement according to configuration 4, wherein the picture, pattern, indicia and/or code refers to and/or comprises at least one of a quick response (QR) code, a two-dimensional code, a bar code, an alphanumerical code, and a stenography code.

Configuration 6: The LWIR imaging arrangement according to any of configurations 1 to 5, wherein the LWIR imaging system and/or the LWIR imaging arrangement is configured to store an acquisition time, wherein the acquisition time is indicative of a time instant or time period, at which or during which the image data were acquired. Optionally, the LWIR imaging system and/or the LWIR imaging arrangement may be configured to transmit the acquisition time to the server.

Configuration 7: The LWIR imaging arrangement according to any of configurations 1 to 6, wherein the LWIR imaging arrangement comprises a location sensor configured to determine a geographical position (or location) of the LWIR imaging system and/or the LWIR imaging arrangement, wherein the LWIR imaging system and/or the LWIR imaging arrangement is configured to determine and/or store an acquisition location, which acquisition location is indicative of a geographical position (or location) of the LWIR imaging system and/or the LWIR imaging arrangement, at which the image data were acquired.

Configuration 8: The LWIR imaging arrangement according to any of configurations 1 to 7, wherein the LWIR imaging arrangement is configured to derive, from the acquired image data of the picture, pattern, indicia and/or code, a code information, wherein the code information is indicative, representative and/or descriptive of the picture, pattern, indicia and/or code on the substrate and/or within the substrate.

Configuration 9: The LWIR imaging arrangement according to any of configurations 1 to 8, wherein the LWIR imaging system and/or the LWIR imaging arrangement is configured to transmit, e.g. via a communication circuitry of the LWIR imaging system and/or a communication circuitry of the LWIR imaging arrangement, the derived code information, e.g. in the form of code data, to a server in order to authenticate the code information, the picture, the pattern, indicia and/or the code.

Configuration 10: The LWIR imaging arrangement according to any of configurations 1 to 9, wherein the LWIR imaging system and/or the LWIR imaging arrangement is configured to transmit a time information and/or a time stamp along with the derived code information to the server, wherein the time information and/or the time stamp is indicative of a time instant or time period, at which or during which the code information was derived by the LWIR imaging system and/or the LWIR imaging arrangement. Alternatively or additionally, the time information and/or the time stamp may be indicative of a transmission time, at which the derived code information was transmitted to the server. Alternatively or additionally, a location information indicative of a geographical position or location of the LWIR imaging system and/or the LWIR imaging arrangement may be transmitted along with the derived code information. It should be noted that the time information and/or the location information can be transmitted to the server together with the derived code information or sequentially.

Configuration 11: The LWIR imaging arrangement according to any of configurations 1 to 10, wherein the LWIR imaging system and/or the LWIR imaging arrangement is configured to receive and/or retrieve, from the server, authentication data, wherein the authentication data is indicative of an authenticity of the code information and/or allows a user of the LWIR imaging system and/or the LWIR imaging arrangement to determine authenticity of the code information. Alternatively or additionally, the authentication data may be indicative of an authenticity of the picture, pattern, indicia and/or code on the substrate. Alternatively or additionally, the authentication data may allow a user of the LWIR imaging system and/or the LWIR imaging arrangement to determine authenticity of the picture, pattern, indicia and/or code on the substrate. Optionally, also a time information may be received by the LWIR imaging system and/or the LWIR imaging arrangement from the server along with the authentication data.

Configuration 12: The LWIR imaging arrangement according to configuration 11, wherein the authentication data comprise an authentic and/or genuine image of the picture, pattern, indicia and/or code stored on the server.

In the following, illustrative configurations of a server according to an aspect of the present disclosure are described.

Configuration 1: A server configured to receive, from an LWIR imaging system and/or an LWIR imaging arrangement, code information indicative, representative and/or descriptive of a picture, pattern, indicia and/or code on a substrate and/or within the substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following.

Configuration 2: The server according to configuration 1, wherein the server is configured to compare the code information received from the LWIR imaging system and/or the LWIR imaging arrangement, with code information stored in a database of the server. Optionally, the server may be configured to, based on the comparison, determine authentication data indicative of an authenticity of the code information and/or allowing a user of an LWIR imaging system and/or the LWIR imaging arrangement to determine authenticity of the code information (and/or the product, item and/or object the code information is associated with). For example, the authentication data may comprise data and/or information related to a specification of the object, item and/or product, such as e.g. a weight, a composition, a type, a serial number, an identification number, a production date, a manufacturing date, a manufacturing company, a manufacturing site, a lot number or any other information related to the specification of the object, item and/or product. Alternatively or additionally, the authentication data may comprise an authentic and/or genuine image of the picture, pattern, indicia and/or code.

Configuration 3: The server according to configuration 1 or 2, wherein the server is configured to send, transmit, and/or provide the authentication data to the LWIR imaging system and/or the LWIR imaging arrangement.

In the following, an illustrative and exemplary method of authenticating a picture, pattern, indicia and/or code on a substrate and/or within the substrate according to an aspect of the present disclosure is described.

Exemplary method 1: A method of authenticating a picture, pattern, indicia and/or code on a substrate and/or within the substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following. The method comprises the following steps:

acquiring, with an LWIR imaging system and/or an LWIR imaging arrangement, image data of the picture, pattern, indicia and/or code, e.g. based on illuminating the picture, pattern, indicia and/or code with the infrared light emitting device;

deriving and/or determining, based on processing the acquired image data with the LWIR imaging system and/or the LWIR imaging arrangement, code information indicative, representative and/or descriptive of the picture, pattern, indicia and/or code on the substrate and/or within the substrate; and transmitting and/or providing, with the LWIR imaging system and/or the LWIR imaging arrangement, the derived code information to a server.

Exemplary method 2: The method of exemplary method 1, further comprising: retrieving and/or receiving, with the LWIR imaging system and/or the LWIR imaging arrangement, authentication data from the server, the authentication data being indicative of an authenticity of the code information and/or allowing a user of the LWIR imaging system and/or the LWIR imaging arrangement to determine authenticity of the code information. For instance, the authentication data may comprise an authentic and/or genuine image of the picture, pattern, indicia and/or code stored on the server.

Exemplary method 3: The method of exemplary methods 1 or 2, further comprising: displaying at least a part of the authentication data on a display of a computer device of the LWIR imaging arrangement.

Exemplary method 4: The method of any of exemplary methods 1 to 3, further comprising: receiving, by the server, code information from the LWIR imaging system and/or the LWIR imaging arrangement. The method may further comprise determining a product, item, object and/or code information associated therewith and stored in a database of the server based on comparing the code information received from the LWIR imaging system and/or the LWIR imaging arrangement with the code information stored in the database.

Exemplary method 5: The method of any of exemplary methods 1 to 4, further comprising: printing and/or applying the picture, pattern, indicia and/or code on a substrate, wherein the picture, pattern, indicia and/or code comprises an amorphous and/or crystalline structure of phosphate salts and/or sulphate salts on the surface of the substrate and/or within the substrate. Optionally, the substrate, picture, pattern, indicia and/or code may comprise quantum dots, as described above and in the following.

Exemplary method 6: The method of any of exemplary methods 1 to 5, further comprising: activating, on and/or with the server, the picture, pattern, indicia, code and/or the code information based on storing the code information in the server's database and/or based on associating the product, item and/or object with the code information in the database.

According to another exemplary embodiment of the present disclosure a LWIR imaging system for detecting an amorphous and/or crystalline structure of phosphate and/or sulphate salts on the surface of a substrate or within a substrate is provided, the system comprising a) an infrared light emitting source that emits over the whole range of 8 to 14 μm configured to irradiate a substrate, b) a LWIR detecting device configured to detect the intensity of electromagnetic radiation scattered, emitted and/or reflected by the substrate and the amorphous and/or crystalline structure of phosphate and/or sulphate salts and c) a ToF distance sensor configured to determine a distance between the substrate and the LWIR detecting device.

According to a preferred embodiment of the present disclosure the infrared light emitting source is a Peltier element or a resistance based coil heater, the Peltier element preferably being configured to irradiate the substrate homogeneously.

FURTHER ASPECTS

Aspect 1: According to another aspect of the present disclosure a LWIR imaging system for detecting an amorphous and/or crystalline structure of phosphate and/or sulphate salts on the surface of a substrate or within a substrate is provided, the system comprising
a) an infrared light emitting source that emits over the whole range of 8 to 14 μm,
b) a LWIR detecting device and
c) a ToF distance sensor.

Aspect 2: The LWIR imaging system according to aspect 1, wherein the LWIR detecting device is a bolometer or a sensor comprising mercury cadmium telluride and preferably the LWIR detecting device is a bolometer.

Aspect 3: The LWIR imaging system according to any of the preceding aspects, wherein the system further comprises at least one focusing/scattering device for focusing and/or scattering the irradiated infrared light from the infrared light emitting source, wherein the at least one focusing and/or focusing/scattering device is preferably located in the beam path between the infrared light emitting source and the LWIR detecting device.

Aspect 4: The LWIR imaging system according to aspect 3, wherein the at least one focusing device is a collimator and/or the at least one focusing/scattering device is a lens.

Aspect 5: The LWIR imaging system according to any of the preceding aspects, wherein the system further comprises at least one collecting device for collecting and/or focusing the electromagnetic radiation that will be detected by the LWIR detecting device, wherein the at least one collecting device is preferably located in the beam path between the infrared light emitting source and the LWIR detecting device.

Aspect 6: The LWIR imaging system according to aspect 5, wherein the at least one collecting device is an objective, preferably a lens.

Aspect 7: The LWIR imaging system according to any of the preceding aspects, wherein the system further comprises at least one filtering device for filtering the electromagnetic radiation that will be detected by the LWIR detecting device, wherein the at least one filtering device is preferably located in the beam path between the infrared light emitting source and the LWIR detecting device and preferably between the objective if present and the LWIR detecting device.

Aspect 8: The LWIR imaging system according to aspect 7, wherein the at least one filtering device is an optical filter and preferably
i) a bandpass filter, preferably in the range of 8.8 to 9.3 μm or 10.0 to 10.6 μm or 11.3 to 11.8 μm or
ii) a combination of a long pass and short pass filter, preferably a combination of a long pass filter of 8 μm and a short pass filter of 8.8 μm or a combination of a long pass filter of 10.3 μm and a short pass filter of 10.8 μm, or
iii) a tunable filter, preferably a tunable MEMS Fabry-Perot filter, wherein the tunable filter in the range of 8 to 14 μm has preferably a spectral resolution of 100 nm and below.

Aspect 9: The LWIR imaging system according to any of the preceding aspects, wherein the ToF distance sensor is located in the beam path between the infrared light emitting source and the LWIR detecting device and preferably is equidistant from the infrared light emitting source and the LWIR detecting device.

Aspect 10: The LWIR imaging system according to any of the preceding aspects, wherein the system further comprises a graphical image device, preferably a CCD camera.

Aspect 11: The LWIR imaging system according to any of the preceding aspects, wherein the system is located in a housing, preferably in a handheld housing, and the housing is preferably connectable to a computer device, preferably a mobile phone.

Aspect 12: The LWIR imaging system according to aspect 11, wherein the housing further comprises a button for activating the LWIR detecting device and/or the graphical image device without direct operation of the computer device.

Aspect 13: The LWIR imaging system according to any of the preceding aspects,
wherein the system is located in or on a snap-on device that can be mounted on a mobile phone or
wherein parts of the system are located in or on a snap-on device that is mounted on a mobile phone and the remaining parts are located on the mobile phone.

Aspect 14: Use of the LWIR imaging system according to aspects 1 to 13 for detecting the intensity of the contrast of electromagnetic radiation scattered and/or emitted and/or reflected by a substrate and an amorphous and/or crystalline structure of phosphate and/or sulphate salts, due to the irradiation with the infrared light emitting source.

Aspect 15: The use according to aspect 14, wherein the system provides at least two recordings per second of an identical part of the substrate comprising the amorphous and/or crystalline structure of phosphate and/or sulphate salts and combining these pictures in order to reduce the signal to noise ratio.

Further clauses describing one or more aspects of the present disclosure are provided in the following.

Clause 1: A method for detecting an amorphous and/or crystalline structure of phosphate 20 and/or sulphate salts on the surface of a substrate or within a substrate, the method comprising the steps of:
i) providing a Long-Wave-Infrared, LWIR, imaging system, the LWIR imaging system comprising:
  a) an infrared light emitting source configured to emit infrared light over the whole range of 8 to 14 μm,
  b) a LWIR detecting device configured to detect an intensity of electromagnetic radiation scattered, emitted and/or reflected by the substrate and the amorphous and/or crystalline structure of phosphate and/or sulphate salts; and
  c) a control circuitry for controlling the LWIR detecting device;
ii) providing a substrate comprising an amorphous and/or crystalline structure of phosphate and/or sulphate salts on the surface of the substrate or within the substrate;
ii) irradiating the provided substrate with the infrared light emitting source;
iii) acquiring, using the LWIR detecting device, a stream of a plurality of temporally consecutive images of the substrate and the amorphous and/or crystalline structure of phosphate and/or sulphate salts irradiated with the infrared light emitting source; and
iv) selecting, based on processing the acquired stream of images with the control circuitry, at least one focused image, in which the amorphous and/or crystalline structure of phosphate and/or sulphate salts is substantially in focus of the LWIR detecting device.

Clause 2: The method according to clause 1, wherein selecting the at least one focused image includes determining one or more image parameters of each image of the acquired stream of images; and
  comparing the determined one or more image parameters of each image with one or more reference image parameters.

Clause 3: The method according to clause 2, wherein the at least one focused image is selected based on determining that the determined one or more image parameters substantially matches the one or more reference image parameters.

Clause 4: The method according to any of clauses 2 and 3, wherein the one or more image parameters include at least one of a sharpness, a non-sharpness, and a fuzzyness of the respective image; and/or
wherein the one or more reference image parameters include at least one of a reference sharpness, a reference non-sharpness, and a reference fuzzyness.

Clause 5: The method according to any of the preceding clauses, wherein the at least one focused image is selected based on comparing at least two images of the acquired stream of images.

Clause 6: The method according to any of the preceding clauses, wherein the at least one focused image is selected based comparing one or more image parameters of at least two images of the acquired stream.

Clause 7: The method according to any of the preceding clauses, wherein the amorphous and/or crystalline structure of phosphate salts and/or sulphate salts on the surface of the substrate and/or within the substrate comprises a covert or overt code which is hardly visible or invisible for the unaided human eye,
preferably wherein the code is usable for authenticating an object, item and/or product associated with the substrate comprising the code.

Clause 8: The method according to clause 7, wherein the at least one focused image is selected based on processing the acquired stream of images and based on determining whether the code and/or code information indicative of the code is successfully derivable from the respective image of the acquired image stream.

Clause 9: The method according to any of clauses 7 and 8, further comprising:
deriving, with the control circuitry, code information from the at least one focused image, the code information being indicative of the code comprised by the amorphous and/or crystalline structure of phosphate salts and/or sulphate salts on the surface of the substrate and/or within the substrate.

Clause 10: The method according to clause 9, further comprising:
verifying authenticity of the code based on transmitting, via a communication circuitry of the LWIR imaging system, the derived code information and/or the at least one focused image to a server.

Clause 11: The method according to clause 10, further comprising:
transmitting a time information to the server, the time information being indicative of a time instant or time period, at which or during which the code information was derived by the LWIR imaging system; and/or transmitting a location information to the server, the location information being indicative of a geographical position or location of the LWIR imaging system.

Clause 12: The method according to any of clauses 10 and 11, wherein verifying authenticity of the code includes receiving and/or retrieving authentication data from the server, the authentication data being indicative of the authenticity of the code and/or the code information.

Clause 13: The method according to clause 12, wherein the authentication data includes an authentic and/or genuine image of the code stored on the server.

Clause 14: The method according to any of clauses 12 and 13, wherein the authentication data comprises data and/or information related to a specification of an object, item and/or product associated with the code, preferably wherein the data and/or information related to the specification includes one or more of a weight, a composition, a type, a serial number, an identification number, a production date, a manufacturing date, a manufacturing company, a manufacturing site, and a lot number of the object, item and/or product.

Clause 15: The method according to any of clauses 7 to 14, wherein the code includes at least one of a quick response code, data matrix, dot code, a two-dimensional code, a bar code, an alphanumerical code, and a steganography code.

Clause 16: The method according to any of clauses 7 to 15, further comprising:

storing an acquisition time in a data storage of the LWIR imaging system, wherein the acquisition time is indicative of a time instant or time period, at which or during which the at least one focused image was acquired; and/or storing an acquisition location in a data storage of the LWIR imaging system, wherein the acquisition location is indicative of a geographical position or location, at which the at least one focused image was acquired.

Clause 17: The method according to any of clauses 1 to 16, further comprising:

displaying at least one of the images of the acquired image stream, the at least one focused image, a code, and/or a code information indicative of a code on a user interface of the LWIR imaging system.

Clause 18: The method according to any of the preceding clauses, further comprising:

providing a confirmation signal to a user of the LWIR imaging system upon selecting the at least one focused image and/or upon successfully deriving code information from the at least one focused image.

Clause 19: The method according to any of the preceding clauses, further comprising:

determining and/or measuring a distance between the LWIR imaging system and the substrate based on and/or using a Time-of-Flight distance sensor of the LWIR imaging system; and/or activating or deactivating the LWIR detecting device based on a Time-of-Flight distance sensor of the LWIR imaging system.

Clause 20: A LWIR imaging system for detecting an amorphous and/or crystalline structure of phosphate and/or sulphate salts on the surface of a substrate or within a substrate, the system comprising:

a) an infrared light emitting source configured to emit infrared light over the whole range of 8 to 14 µm;

b) a LWIR detecting device configured to detect an intensity of electromagnetic radiation scattered, emitted and/or reflected by the substrate and the amorphous and/or crystalline structure of phosphate and/or sulphate salts; and c) a control circuitry configured to:

i) actuate the infrared light emitting source to irradiate a substrate comprising an amorphous and/or crystalline structure of phosphate and/or sulphate salts on the surface of the substrate or within the substrate;

ii) acquire, using the LWIR detecting device based on detecting the intensity of electromagnetic radiation scattered, emitted and/or reflected by the substrate and the amorphous and/or crystalline structure of phosphate and/or sulphate salts, a stream of a plurality of temporally consecutive images of the substrate and the amorphous and/or crystalline structure of phosphate and/or sulphate salts irradiated with the infrared light emitting source; and iii) select, based on processing the acquired stream of images, at least one focused image, in which the amorphous and/or crystalline structure of phosphate and/or sulphate salts is substantially in focus of the LWIR detecting device.

Clause 21: Use of a LWIR imaging system according to clause 20 for acquiring at least one image based on detecting an intensity of electromagnetic radiation scattered, emitted and/or reflected by a substrate comprising an amorphous and/or crystalline structure of phosphate and/or sulphate salts on the surface of the substrate or within the substrate.

Clause 22: Use of a LWIR imaging system according to any of clauses 20 to 21 for verifying and/or authenticating a code comprised in the amorphous and/or crystalline structure of phosphate salts and/or sulphate salts on the surface of the substrate and/or within the substrate.

BRIEF DESCRIPTION OF THE DRAWINGS

In the following, aspects of the present disclosure are described with reference to the appended figures (referred to as "Examples") which give background explanations and represent exemplary embodiments.

FIG. 1 shows the principle for a transmission-based setup.

FIGS. 2 and 3 each show the principle for a reflectance-based setup.

FIG. 4 illustrates the spectral ranges of an 80 g/m$^2$ calcium carbonate containing paper with calcium phosphate containing printed pattern on the surface.

FIGS. 5 to 8 each show an exemplary LWIR imaging system and/or LWIR imaging arrangement.

FIG. 9 illustrates information displayed on a user interface of an exemplary LWIR imaging system and/or LWIR imaging arrangement

DETAILED DESCRIPTION OF EXEMPLARY EMBODIMENTS AND EXAMPLES

Example 1

Example 1 refers to the geometry and the arrangement of the single components in the LWIR imaging system and/or LWIR imaging arrangement.

FIG. 1 shows the principle for a transmission-based setup and FIGS. 2 and 3 show the principle for a reflectance-based setup. The LWIR imaging system and/or LWIR imaging arrangement consist of the following parts:
- a: lens and/or collimator
- b: infrared light emitting source or sources
- c: lens
- d: bandpass filter
- e: LWIR detecting device (image sensor)
- g: optional ToF distance sensor Furthermore the printed substrate for the detection (f) is shown which is not a part of the LWIR imaging system and/or LWIR imaging arrangement.

Example 2

The selection of the filtering device, for example the bandpass filter, depends on the substrate and the amorphous and/or crystalline structure of the phosphate and sulphate salts within the print on the substrate. In FIG. 4 the spectral ranges of an 80 g/m² calcium carbonate containing paper with calcium phosphate containing printed pattern on the surface are shown where the contrast signal to noise ratio is as high as possible. Bandpass filter options to detect the particular calcium phosphate containing pattern could be selected from A, (8.8-9.3 μm), B (10.0-10.6 μm) or C (11.3-11.8 μm). The spectra in FIG. 4 is measured at 27.9° C. and 49% relative humidity, with an BRUKER VERTEX FTIR Spectrometer having a Liq-$N_2$ cooled MCT detector with MIR sources, with the following specifications and settings:

6 mm Aperture, Resolution 4 cm, Scans 1024, Signals around 80-350 back ground signal 17, Transmission signal 22,000, reflectivity 2,000.

Example 3

The LWIR imaging system according to the present disclosure or parts thereof can be located in a housing and the housing can be connectable to a mobile phone as shown in FIGS. 5 and 6.

Abbreviations A, B, C, D, E and F have the following meanings:
- A: Infrared light emitting source that emits over the whole range of 8 to 14 μm
- B: LWIR detecting device
- C: optional ToF distance sensor
- D: Opening for CCD camera located on the mobile phone
- E: Button for activating the LWIR detecting device
- F: Opening for touch screen of the mobile phone Example 4

The LWIR imaging system or parts of the LWIR imaging system and/or LWIR imaging arrangement can be located in a snap-on device that can be connected to a mobile phone, for example via USB connection as shown in FIG. 8. Abbreviations A, B and C have the following meanings:
- A: LWIR imaging system and/or LWIR imaging arrangement in the form of a snap-on device (1 IR-light emitting source, 2 ToF distance sensor, 3 LWIR camera with lens)
- B: USB connection
- C: mobile phone Example 5

Pictures are taken with a standard visible camera (FIG. 9, left) and an LWIR imaging system and/or LWIR imaging arrangement according to the present disclosure, wherein the infrared light emitting source is a Peltier element (FIG. 9, right) of a substrate comprising an amorphous and/or crystalline structure of phosphate and/or sulfate salts on the surface in the form of a printed label on a plastic bag. As can be seen in FIG. 9, left, it is not possible to detect the QR code with the human eye or a standard visible camera. However, the data matrix code pattern is indeed visible, when detected with the LWIR imaging system of the present disclosure.

It is to be noted that the LWIR imaging system and/or LWIR imaging arrangement may include further components and/or elements, such as e.g. the control circuitry, one or more processors, one or more communication interfaces, one or more data storages, one or more communication circuitries, as described hereinabove, which are not shown in the figures.

The invention claimed is:

1. A method for detecting an amorphous and/or crystalline structure of phosphate and/or sulphate salts on the surface of a substrate or within a substrate, the method comprising the steps of:
   i) providing a Long-Wave-Infrared, LWIR, imaging system, the LWIR imaging system comprising:
      a) an infrared light emitting source configured to emit infrared light over the whole range of 8 to 14 μm,
      b) a LWIR detecting device configured to detect an intensity of electromagnetic radiation scattered, emitted and/or reflected by the substrate and the amorphous and/or crystalline structure of phosphate and/or sulphate salts; and
      c) a control circuitry for controlling the LWIR detecting device;
   ii) providing a substrate comprising an amorphous and/or crystalline structure of phosphate and/or sulphate salts on the surface of the substrate or within the substrate;
   iii) irradiating the provided substrate with the infrared light emitting source;
   iv) acquiring, using the LWIR detecting device, a stream of a plurality of temporally consecutive images of the substrate and the amorphous and/or crystalline structure of phosphate and/or sulphate salts irradiated with the infrared light emitting source; and
   v) selecting, based on processing the acquired stream of images with the control circuitry, at least one focused image, in which the amorphous and/or crystalline structure of phosphate and/or sulphate salts is substantially in focus of the LWIR detecting device.

2. The method according to claim 1, wherein selecting the at least one focused image includes determining one or more image parameters of each image of the acquired stream of images; and
   comparing the determined one or more image parameters of each image with one or more reference image parameters.

3. The method according to claim 2, wherein the at least one focused image is selected based on determining that the determined one or more image parameters substantially matches the one or more reference image parameters.

4. The method according to claim 2, wherein the one or more image parameters include at least one of a sharpness, a non-sharpness, and a fuzzyness of the respective image; and/or
   wherein the one or more reference image parameters include at least one of a reference sharpness, a reference non-sharpness, and a reference fuzzyness.

5. The method according to claim 1, wherein the at least one focused image is selected based on comparing at least two images of the acquired stream of images.

6. The method according to claim 1, wherein the at least one focused image is selected based comparing one or more image parameters of at least two images of the acquired stream.

7. The method according to claim 1, wherein the amorphous and/or crystalline structure of phosphate salts and/or sulphate salts on the surface of the substrate and/or within the substrate comprises a covert or overt code which is hardly visible or invisible for the unaided human eye.

8. The method according to claim 7, wherein the at least one focused image is selected based on processing the acquired stream of images and based on determining whether the code and/or code information indicative of the code is successfully derivable from the respective image of the acquired image stream.

9. The method according to claim 7, further comprising:
deriving, with the control circuitry, code information from the at least one focused image, the code information being indicative of the code comprised by the amorphous and/or crystalline structure of phosphate salts and/or sulphate salts on the surface of the substrate and/or within the substrate.

10. The method according to claim 9, further comprising:
verifying authenticity of the code based on transmitting, via a communication circuitry of the LWIR imaging system, the derived code information and/or the at least one focused image to a server.

11. The method according to claim 10, further comprising:
transmitting a time information to the server, the time information being indicative of a time instant or time period, at which or during which the code information was derived by the LWIR imaging system; and/or
transmitting a location information to the server, the location information being indicative of a geographical position or location of the LWIR imaging system.

12. The method according to claim 10, wherein verifying authenticity of the code includes receiving and/or retrieving authentication data from the server, the authentication data being indicative of the authenticity of the code and/or the code information.

13. The method according to claim 12, wherein the authentication data includes an authentic and/or genuine image of the code stored on the server.

14. The method according to claim 12, wherein the authentication data comprises data and/or information related to a specification of an object, item and/or product associated with the code.

15. The method according to claim 12, wherein the authentication data comprises data and/or information related to a specification of an object, item and/or product associated with the code,
wherein the data and/or information related to the specification comprises one or more of a weight, a composition, a type, a serial number, an identification number, a production date, a manufacturing date, a manufacturing company, a manufacturing site, and a lot number of the object, item and/or product.

16. The method according to claim 7, wherein the code includes at least one of a quick response code, data matrix, dot code, a two-dimensional code, a bar code, an alphanumerical code, and a steganography code.

17. The method according to claim 7, further comprising:
storing an acquisition time in a data storage of the LWIR imaging system, wherein the acquisition time is indicative of a time instant or time period, at which or during which the at least one focused image was acquired; and/or
storing an acquisition location in a data storage of the LWIR imaging system, wherein the acquisition location is indicative of a geographical position or location, at which the at least one focused image was acquired.

18. The method according to claim 1, further comprising:
displaying at least one of the images of the acquired image stream, the at least one focused image, a code, and/or a code information indicative of a code on a user interface of the LWIR imaging system.

19. The method according to claim 1, further comprising:
providing a confirmation signal to a user of the LWIR imaging system upon selecting the at least one focused image and/or upon successfully deriving code information from the at least one focused image.

20. The method according to claim 1, further comprising:
determining and/or measuring a distance between the LWIR imaging system and the substrate based on and/or using a Time-of-Flight distance sensor of the LWIR imaging system; and/or
activating or deactivating the LWIR detecting device based on a Time-of-Flight distance sensor of the LWIR imaging system.

21. The method according to claim 1, wherein the amorphous and/or crystalline structure of phosphate salts and/or sulphate salts on the surface of the substrate and/or within the substrate comprises a covert or overt code which is hardly visible or invisible for the unaided human eye,
wherein the code authenticates an object, item and/or product associated with the substrate comprising the code.

22. A LWIR imaging system for detecting an amorphous and/or crystalline structure of phosphate and/or sulphate salts on the surface of a substrate or within a substrate, the system comprising:
a) an infrared light emitting source configured to emit infrared light over the whole range of 8 to 14 μm,
b) a LWIR detecting device configured to detect an intensity of electromagnetic radiation scattered, emitted and/or reflected by the substrate and the amorphous and/or crystalline structure of phosphate and/or sulphate salts; and
c) a control circuitry configured to:
i) actuate the infrared light emitting source to irradiate a substrate comprising an amorphous and/or crystalline structure of phosphate and/or sulphate salts on the surface of the substrate or within the substrate;
ii) acquire, using the LWIR detecting device based on detecting the intensity of electromagnetic radiation scattered, emitted and/or reflected by the substrate and the amorphous and/or crystalline structure of phosphate and/or sulphate salts, a stream of a plurality of temporally consecutive images of the substrate and the amorphous and/or crystalline structure of phosphate and/or sulphate salts irradiated with the infrared light emitting source; and
iii) select, based on processing the acquired stream of images, at least one focused image, in which the amorphous and/or crystalline structure of phosphate and/or sulphate salts is substantially in focus of the LWIR detecting device.

23. A method for acquiring at least one image comprising acquiring at least one image based on detecting an intensity of electromagnetic radiation scattered, emitted and/or reflected by a substrate comprising an amorphous and/or crystalline structure of phosphate and/or sulphate salts on the surface of the substrate or within the substrate, wherein the detecting is accomplished using the LWIR imaging system of claim 22.

24. The method of claim 23, wherein the method comprises verifying and/or authenticating a code comprised in the amorphous and/or crystalline structure of phosphate salts and/or sulphate salts on the surface of the substrate and/or within the substrate.

* * * * *